(12) United States Patent
Matsuda et al.

(10) Patent No.: US 7,424,858 B2
(45) Date of Patent: Sep. 16, 2008

(54) RUDDER ANGLE SENSOR

(75) Inventors: Masahiro Matsuda, Tsurugashima (JP);
Yoshinori Iwaki, Tsurugashima (JP);
Osamu Nakamura, Tsurugashima (JP)

(73) Assignee: Toyo Denso Kabushiki Kaisha, Minato-Ku (JP)

( * ) Notice: Subject to any disclaimer, the term of this patent is extended or adjusted under 35 U.S.C. 154(b) by 0 days.

(21) Appl. No.: 11/678,758

(22) Filed: Feb. 26, 2007

(65) Prior Publication Data

US 2008/0009993 A1 Jan. 10, 2008

(30) Foreign Application Priority Data

Jul. 4, 2006 (JP) .............................. 2006-184098
Jul. 21, 2006 (JP) .............................. 2006-199790

(51) Int. Cl.
*B63H 25/04* (2006.01)
(52) U.S. Cl. ................................................. 114/144 E
(58) Field of Classification Search ............... 114/144 E
See application file for complete search history.

(56) References Cited

U.S. PATENT DOCUMENTS 5,646,523 A * 7/1997 Kaiser et al. ............. 324/207.2
6,597,141 B1 * 7/2003 Wilson-Jones et al. ...... 318/560

FOREIGN PATENT DOCUMENTS

JP 204045083 A * 2/2004

* cited by examiner

*Primary Examiner*—Jesús D Sotelo
(74) *Attorney, Agent, or Firm*—Burr & Brown

(57) ABSTRACT

There is provided a rudder angle sensor that is attached to a steering shaft for measuring an absolute angle of the steering shaft and includes: a coarse signal measuring mechanism and a fine signal measuring mechanism which measure a rotation angle of the steering shaft which rotates a predetermined number of times, the coarse signal measuring mechanism outputting a coarse signal and the fine signal measuring mechanism outputting a fine signal; and a calculating mechanism which calculates the absolute angle of the steering shaft based on coarse signal measurement data and fine signal measurement data converted from the coarse signal and the fine signal respectively, wherein the calculating mechanism is constituted by including an abnormal data detecting and eliminating unit which detects and eliminates abnormal data deviating from a predetermined range from the measurement data.

9 Claims, 17 Drawing Sheets

RUDDER ANGLE SENSOR

BACKGROUND OF THE INVENTION

1. Field of the Invention

The present invention relates to a rudder angle sensor for detecting a rotation angle of a main drive gear (steering shaft) mounted in a vehicle such as an automobile.

2. Description of the Related Art

As a hitherto known rudder angle sensor (hereinafter referred to as "first conventional sensor" accordingly), there is one described in Patent Document 1 for example. The conventional rudder angle sensor is constituted by including a first gear interlocked with a main drive gear (steering shaft) to rotate and a second gear interlocked with the first gear to rotate at higher speed than the first gear. In the first conventional sensor, it is required to detect a rotation angle of the steering shaft with high accuracy, and as means to achieve this requirement, a third gear engaging with the first gear is provided therein.

[Patent Document 1] Japanese Patent Application Laid-open No. 2004-198287 (refer to paragraph 0016 and FIG. 3)

Further, a rudder angle sensor disclosed in Patent Document 2 (hereinafter referred to as "second conventional sensor" accordingly) is for detecting a front wheel rudder angle (rotation angle of the steering shaft) of a four-wheel steering vehicle, and determining a target rear wheel rudder angle for steering rear wheels according to the detected front wheel rudder angle. In order to prevent a minute variation in the detected front wheel rudder angle from taking effect, the second conventional sensor is constructed to perform sampling at predetermined time intervals and calculate the target rear wheel steering angle based on a weighted average value of the front wheel rudder angle which has been sampled from a predetermined time in advance to the current time. As a reason to adopt this structure, the Patent Document 2 describes that it is intended for preventing a minute variation from affecting the weighted average value when the minute variation occurs in the detected front wheel rudder angle.

[Patent Document 2] Japanese Patent Application Laid-open No. H07-25349 (refer to paragraph 0010 to 0020 and FIG. 3)

Furthermore, a rudder angle sensor disclosed in Patent Document 3 (hereinafter referred to as "third conventional sensor" accordingly) is constituted by including a hall element and a magnet. In the third conventional sensor, it is required to detect a rotation angle of the steering shaft with high accuracy, and as means to achieve this requirement, a ring-shaped ferromagnetic material is provided around the magnet. Since a detecting means is constituted of a plurality of magnetic detecting means, there is mutual magnetic interference between magnets. Patent Document 3 describes that this interference causes a problem of decreasing accuracy in detection values of the rotation angle, but since the third conventional sensor is provided with the ring-shaped ferromagnetic material around the magnet and a distance between the magnet and an ARM element is limited to approximately one-tenth or smaller as compared to the distance between the magnet and the ferromagnetic material, magnetic lines of force generated from two magnets are well prevented from leaking, and thus high accuracy in detection can be maintained without disturbing the magnetic fields of the magnets with each other. [Patent Document 3] Japanese Patent Application Laid-open No. 2004-271427 (refer to paragraph 0017, paragraph 0023, FIG. 1)

It is needless to mention that high accuracy is required for rudder angle sensors, but there are various factors to disturb the high accuracy. For example, according to a change in surrounding environment where an automobile is used, there may occur drifting in temperature, humidity or the like in electronic parts including the rudder angle sensor. In this case, it is possible that adverse effects due to the above drifting turn to abnormal data and eventually affect the accuracy in detection. With only the combination of gears adopted in the first conventional sensor, such abnormal data cannot be eliminated. Further, even with the rudder angle detection by means of weighted average value of sampled front wheel rudder angles adopted in the second conventional sensor, the above abnormal data cannot be eliminated either. This is because the second conventional sensor is constructed only for eliminating effects by a minute variation in the front wheel rudder angle. Moreover, with the third conventional sensor, it is not possible to completely eliminate effects of the magnet. The third conventional sensor asserts that there is no mutual interference of magnetism since, as described above, the distance between the magnet and the hall element (ARM element) is limited to approximately one-tenth or smaller as compared to the distance between the magnet and the ferromagnetic material (paragraph 0023), but this distance depends on a mutual relationship with the magnetic force of the magnet, and therefore it is hard to say that the decrease in accuracy of detection is completely prevented.

Accordingly, an object of the present invention is to provide a rudder angle sensor with higher accuracy by, firstly, preventing decrease in accuracy of detection of a rotation angle based on detection of abnormal data, and secondly, eliminating mutual interference of magnetism.

SUMMARY OF THE INVENTION

The inventors of the present invention conducted development to solve the above-stated problems, and have reached an idea of increasing accuracy in detection of a rotation angle of a steering shaft by attaining measurement data of a coarse signal and a fine signal and further attaining excessive measurement data by performing excessive measurement constantly where normally measurement is performed only once at predetermined time intervals, and then eliminating abnormal data deviating from a predetermined range from the attained data and eliminating mutual interference of magnetism. The present invention has been made from this view point. Detailed contents thereof will be described below. Note that definitions or the like of terms made in explanation of the invention according to any claim also apply to the invention according to any other claim within possible ranges of their nature.

(Characteristics of the Invention Described in claim 1)

A rudder angle sensor according to the invention described in claim 1 (hereinafter referred to as "rudder angle sensor of claim 1" accordingly) is a sensor attached to a steering shaft for measuring an absolute angle of the steering shaft. Specifically, the rudder angle sensor includes: a coarse signal measuring mechanism and a fine signal measuring mechanism which measure a rotation angle of the steering shaft which rotates a predetermined number of times, the coarse signal measuring mechanism outputting a coarse signal and the fine signal measuring mechanism outputting a fine signal; and a calculating mechanism which calculates the absolute angle of the steering shaft based on coarse signal measurement data and fine signal measurement data converted from the coarse signal and the fine signal respectively. Here, the calculating mechanism is constituted by including an abnormal data detecting and eliminating unit which detects and eliminates abnormal data deviating from a predetermined range from the measurement data.

With the rudder angle sensor of claim 1, the coarse signal measuring mechanism outputs a coarse signal, and the fine signal measuring mechanism outputs a fine signal. Upon reception of the coarse signal measurement data and the fine signal measurement data converted from the coarse signal and the fine signal, the calculating mechanism calculates the absolute angle of the steering shaft based on both the signals. The abnormal data detecting and eliminating unit included in the calculating mechanism detects abnormal data deviated from a predetermined range in measurement data and eliminates the detected abnormal data. Detection and elimination of abnormal data greatly contributes to drastic increase in accuracy of the absolute angle. Specifically, by eliminating the abnormal data, adverse effects to the absolute angle of the steering shaft which should have occurred when not performing the elimination are eliminated, thereby increasing the accuracy of the absolute angle.

(Characteristics of the Invention Described in claim 2)

In the rudder angle sensor according to the invention described in claim 2 (hereinafter referred to as "rudder angle sensor of claim 2" accordingly), in addition to the basic structure of the rudder angle sensor of claim 1 included, the measuring mechanisms are each constituted by further including an oversampling unit which performs plural times of excessive measurement from at least the fine signal.

With the rudder angle sensor of claim 2, in addition to the operation and effect of the rudder angle sensor of claim 1, the measuring mechanism performs oversampling of performing plural times of excessive measurement from at least the fine signal, so that the accuracy thereof can be improved. Note that the oversampling is necessary to be performed at least on the fine signal, but it is preferable to be performed also on the coarse signal. Similarly to the fine signal, the coarse signal may include abnormal data, and when included, such abnormal data can cause adverse effects to the absolute value of the steering shaft. Accordingly, it is preferable for increasing accuracy of the absolute angle that the abnormal data related to the coarse signal is eliminated as well.

(Characteristics of the Invention Described in claim 3)

In the rudder angle sensor according to the invention described in claim 3 (hereinafter referred to as "rudder angle sensor of claim 3" accordingly), in addition to the basic structure of the rudder angle sensor of claim 1 or claim 2 included, the calculating mechanism is constituted by further including a data interpolation processing unit which interpolates selected data arbitrary selected from the measurement data and the excessive measurement data as a substitute for the eliminated abnormal data.

With the rudder angle sensor of claim 3, in addition to the operation and effect of the rudder angle sensor of claim 1 or 2, the accuracy of the absolute angle can be maximized by the interpolation. Specifically, missing occurs in the measurement data as a result of eliminating abnormal data, and if this missing is left as it is, the accuracy decreases by the amount of missing. Accordingly, by constructing the calculating mechanism by including the data interpolation processing unit, the missing amount due to the elimination can be interpolated by selected data selected from existing data, and thereby the measurement accuracy can be increased. Specifically, in the case of not providing the oversampling unit in claim 1, detection and elimination of abnormal data is performed on measurement data obtained from the basic structure of the rudder angle sensor of claim 1, and the missing amount due to the elimination is interpolated by selected data selected from existing data, thereby improving reliability of measurement data. Specifically, it is possible to prevent decrease in accuracy of the measurement. Here, the reason for selecting the selected data from the existing data is that the existing data is closer to the reality as compared to fictitious data since it is actual data, and is conceivable to have higher accuracy. Further, in the case of providing the oversampling unit in claim 2, after the detection and elimination of abnormal data is performed, data selected from a plurality of data obtained by conducting the oversampling can be compensated, and thus the effect of performing the oversampling can be maximized.

(Characteristics of the Invention Described in claim 4)

In the rudder angle sensor according to the invention described in claim 4 (hereinafter referred to as "rudder angle sensor of claim 4" accordingly), in addition to the basic structure of the rudder angle sensor of claim 1, the calculating mechanism is constituted by further including a data interpolation processing unit which calculates an average value of data immediately before and after the eliminated abnormal data from the measured data and interpolates the average value as a substitute for the eliminated abnormal data.

With the rudder angle sensor of claim 4, in addition to the operation and effect of the rudder angle sensor of claim 2, missing occurs in data obtained by measurement as a result of eliminating the abnormal data, and if this missing is left as it is, the accuracy of sampling decreases by the amount of missing. Accordingly, the calculating mechanism is constituted by including the data interpolation processing unit, and this data interpolation processing unit compensates for the amount of missing due to the elimination with an average value obtained by averaging data before and after the missing data, thereby maximizing the effect of the oversampling. The reason for using the average value as data to be interpolated is that, since the average value is obtained by averaging data distributed at quite close time intervals in sequential data row, the average value is conceivable to be closer to the reality as compared to fictitious data, in other words, having higher accuracy.

(Characteristics of the Invention Described in claim 5)

A rudder angle sensor according to the invention described in claim 5 (hereinafter referred to as "rudder angle sensor of claim 5" accordingly) is a rudder angle sensor attached to a steering shaft for measuring an absolute angle of the steering shaft. Specifically the rudder angle sensor includes: a main drive gear interlocked with the steering shaft to rotate reversibly; a first detecting means detecting a rotation angle of a fine signal gear which interlocks with the main drive gear to rotate; and a second detecting means detecting a rotation angle of a coarse signal gear which interlocks with the main drive gear to rotate. The rudder angle sensor is characterized in that the first detecting means is constituted by including a hall element which outputs a fine signal indicating the detected rotation angle of the fine signal gear and a magnet, and the second detecting means is constituted by including a potentiometer which outputs a coarse signal indicating the detected rotation angle of the coarse signal gear.

In the rudder angle sensor of claim 5, the first detecting means is a magnetic detection type including a hall element outputting a fine signal and a magnet, whereas the second detecting means includes a potentiometer outputting a coarse signal but no magnet. Specifically, since there are no magnets adjacent to each other, there is no mutual interference of magnetism. It means that the second detecting means is not affected by magnetic flux generated by the first detecting means and further the first detecting means is not affected by the second detecting means which does not generate magnetic flux, whereby accuracy of detection of the rotation angle does not decrease. Therefore, it is possible to provide a rudder angle sensor with higher accuracy, which is not affected by magnetic fluxes of the adjacent detecting means with each other. Note that since the first detecting means and the second detecting means does not interfere with each other, it is not necessary to have a member for blocking magnetism.

(Characteristics of the Invention Described in claim 6)

The rudder angle sensor according to the invention described in claim 6 (hereinafter referred to as "rudder angle sensor of claim 6" accordingly) is characterized by further including, in addition to the basic structure of the rudder angle sensor of claim 5 included, a calculating mechanism which calculates an absolute angle from both of the first detecting means and the second detecting means by the fine signal gear rotating with increasing speed relative to the main drive gear and the coarse signal gear rotating with decreasing speed relative to the main drive gear.

With the rudder angle sensor of claim 6, in addition to the operation and effect of the rudder angle sensor of claim 5, an accurate fine signal outputted repetitively at a predetermined angle and a coarse signal output by the potentiometer which monotonously increases or decreases in the entire rudder angle range can be obtained, and the absolute angle can be easily calculated by combination of the fine signal and the coarse signal. Further, since one of the adjacent detecting means does not include a magnet in the structure thereof, there is no mutual interference by magnetism. Therefore, a rudder angle sensor with high accuracy can be provided.

(Characteristics of the Invention Described in claim 7)

In the rudder angle sensor according to the invention described in claim 7 (hereinafter referred to as "rudder angle sensor of claim 7" accordingly), in addition to the basic structure of the rudder angle sensor of claim 6 included, the calculating mechanism is characterized in that it provides an absolute angle $\theta a$ by $\theta a=\theta b/m\pm(360/m)\times n$, where $\theta b$ is the rotation angle of the fine signal gear, $\theta c$ is the rotation angle of the coarse signal gear, m is a gear ratio between the main drive gear and the fine signal gear, and n is integer which minimizes an absolute value of $[\theta c-\{\theta b/m\pm(360/m)\times n\}]$.

With the rudder angle sensor of claim 7, in addition to the operation and effect of the rudder angle sensor of claim 6, by the calculating mechanism adopting the calculating means, an effect of easily and accurately calculating the absolute angle can be obtained.

(Characteristics of the Invention Described in claim 8)

The rudder angle sensor according to the invention described in claim 8 (hereinafter referred to as "rudder angle sensor of claim 8" accordingly) is characterized in that, in addition to the basic structure of the rudder angle sensor of claim 7, the calculating mechanism is constituted by including: an oversampling unit which performs plural times of excessive measurement of the absolute angle $\theta a$ from at least the fine signal out of the fine signal and the coarse signal and outputs the excessive measurement data; an abnormal data detecting and eliminating unit which detects and eliminates abnormal data of the absolute angle $\theta a$ when the oversampling unit performs the excessive measurement and outputs the excessive measurement data; and an interpolation processing unit which arbitrarily selects data from the excessive measurement data or further calculates an average value from the arbitrarily selected data and interpolates the arbitrarily selected data or the average value as the substitute for the eliminated abnormal data.

With the rudder angle sensor of claim 8, in addition to the operation and effect of the rudder angle sensor of claim 7, oversampling is performed on the absolute value $\theta a$ detected first and abnormal data is eliminated, so that reliability of finally outputted data drastically improves. Therefore, a rudder angle sensor with high accuracy owing to the improvement in reliability can be provided.

With the rudder angle sensor according to the present invention, decrease in accuracy based on detection of abnormal data when detecting a steering shaft rotation angle is prevented, and there is no mutual interference of magnetism since there are no adjacent magnets. Therefore, a rudder angle sensor with higher accuracy can be provided.

DETAILED DESCRIPTION OF THE PREFERRED EMBODIMENTS

Preferred embodiments (hereinafter referred to as "embodiments") for carrying out the present invention will be explained. As the embodiments, there are embodiment 1 and embodiment 2, where the embodiment 1 is explained first and the embodiment 2 is explained thereafter.

Embodiment 1

The embodiment 1 will be described with reference to the drawings.

Figure 1:
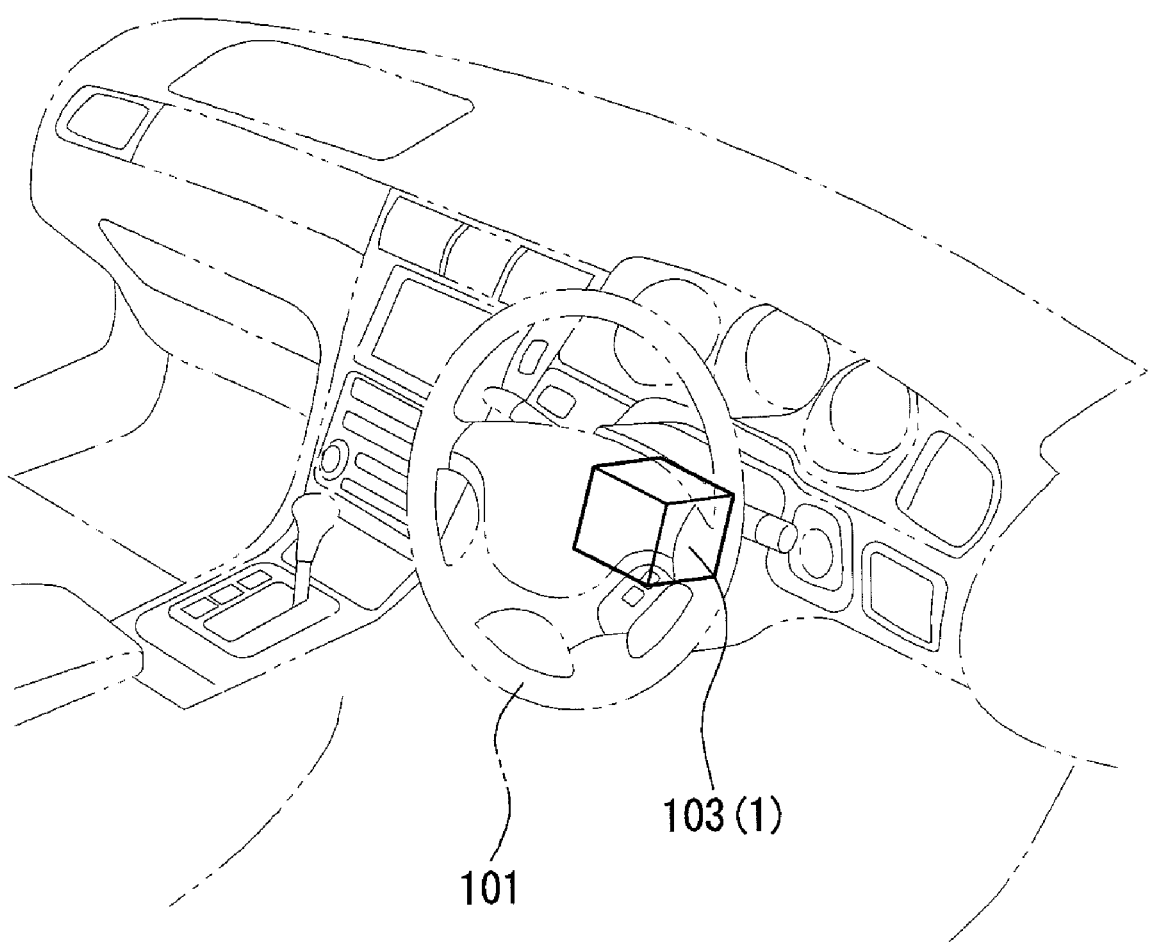
FIG. 1 is a perspective view for showing an overview of an attaching position of a rudder angle sensor in embodiments.
Figure 2:
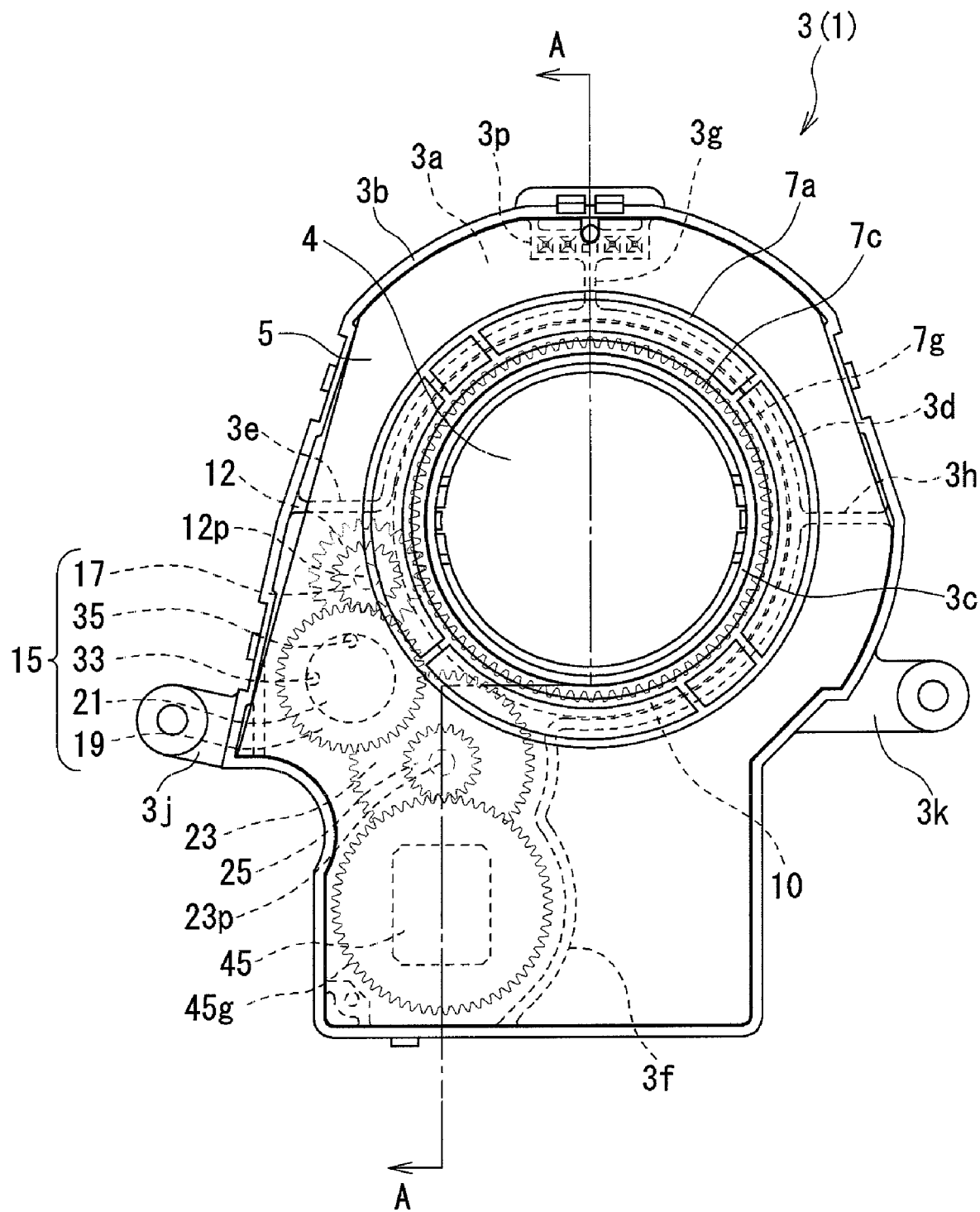
FIG. 2 is a plan view of the rudder angle sensor in embodiment 1.
Figure 3:
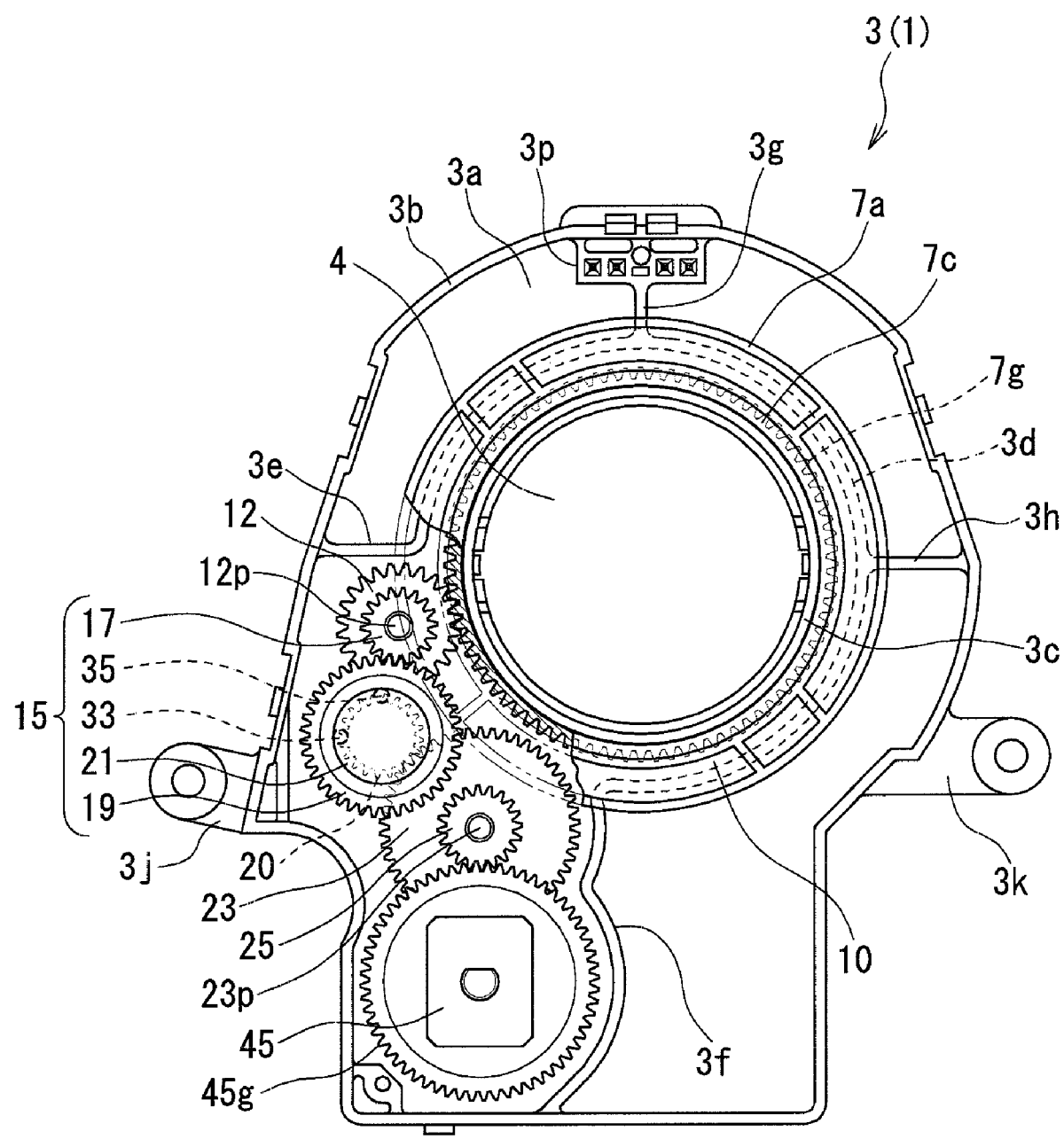
FIG. 3 is a plan view of a state that a supporting substrate of the rudder angle sensor shown in FIG. 2 is removed.
Figure 4:
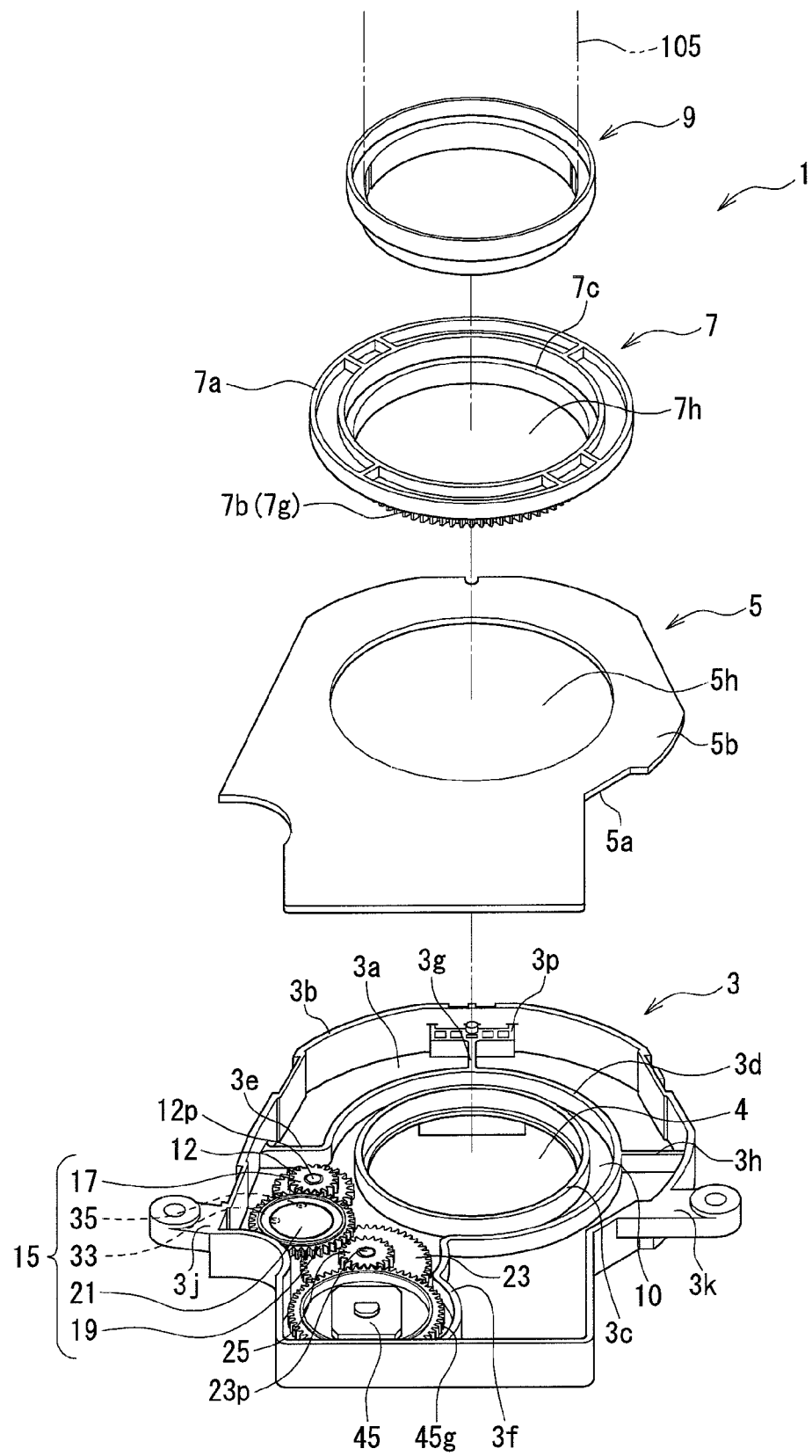
FIG. 4 is an exploded perspective view of the rudder angle sensor in the embodiment 1.
Figure 5:
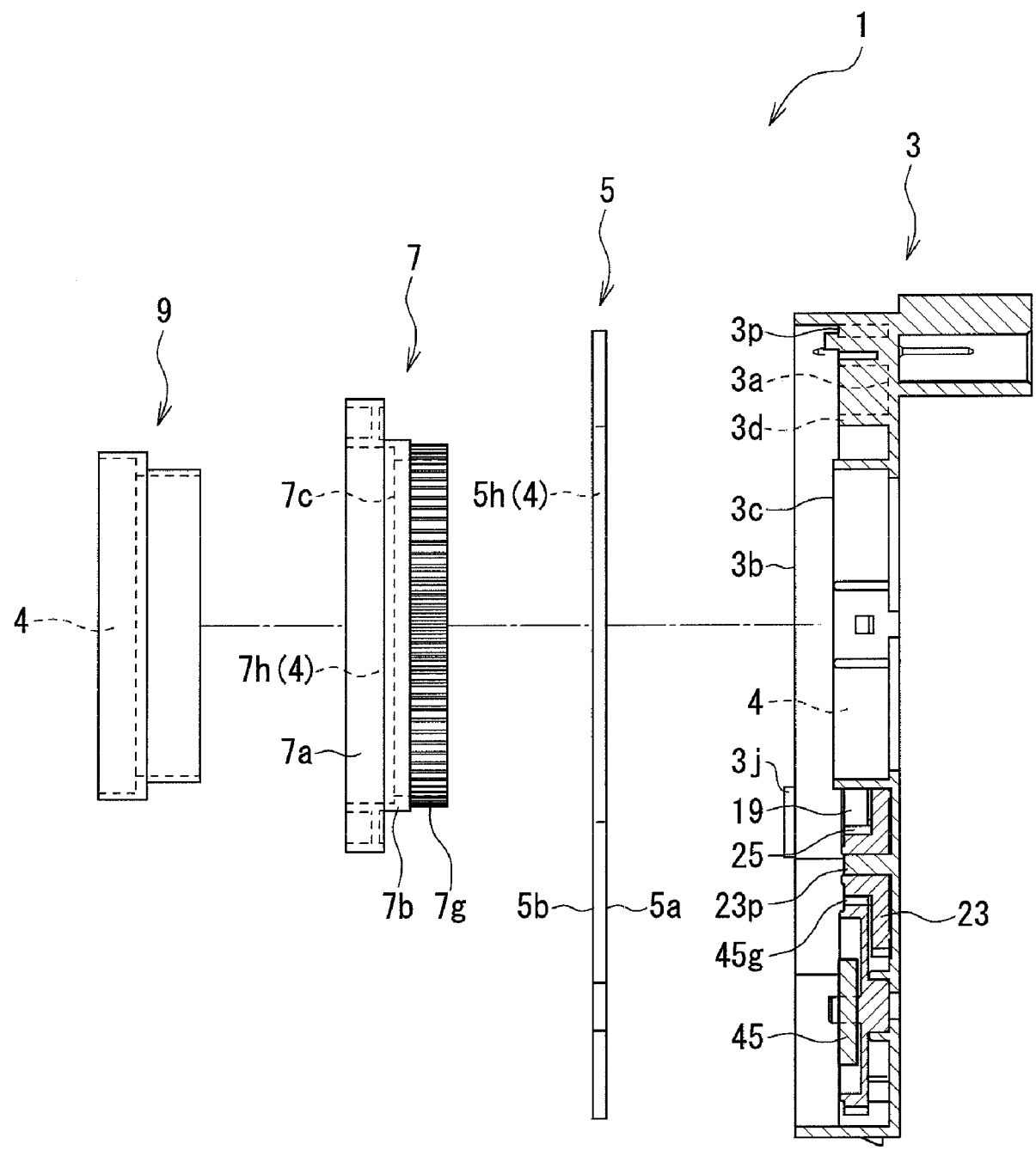
FIG. 5 is a cross-sectional view taken along the A-A line on the rudder angle sensor shown in FIG. 2.
Figure 6:
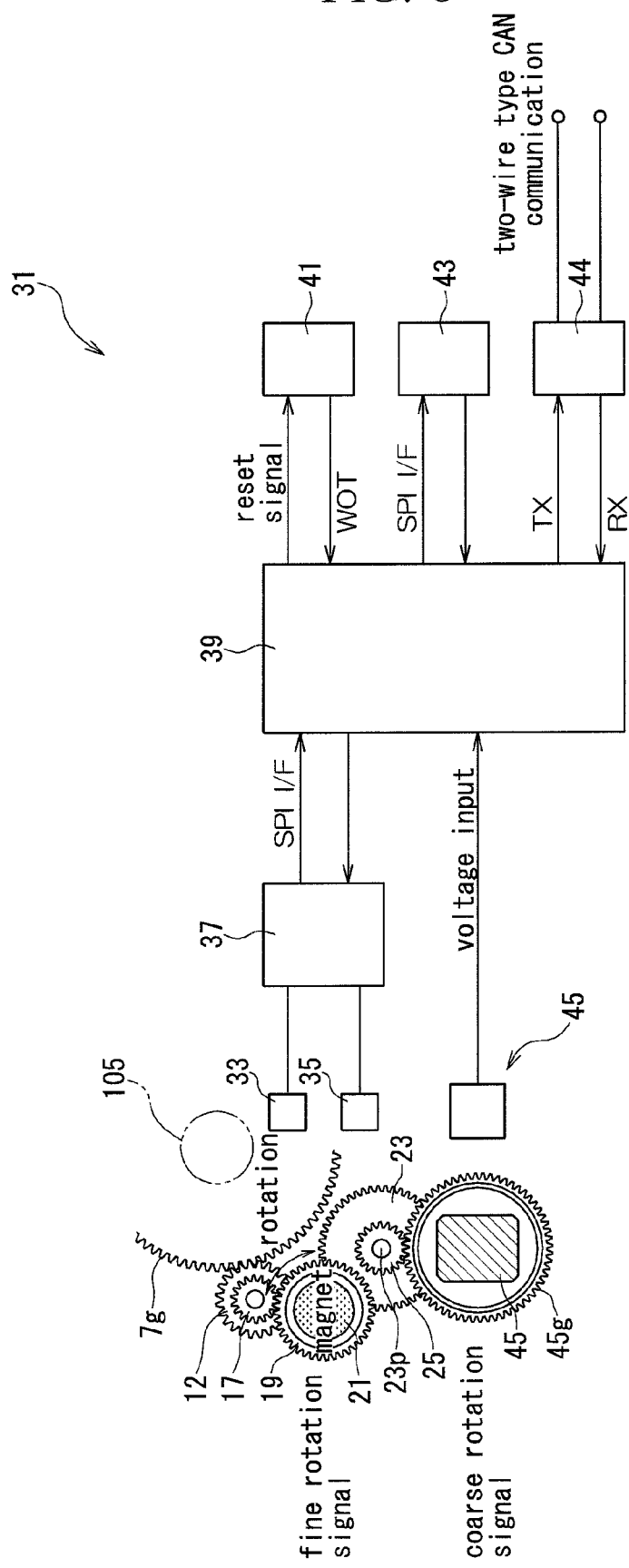
FIG. 6 is a block diagram showing an electrical structure of the rudder angle sensor in the embodiment 1.
Figure 7:
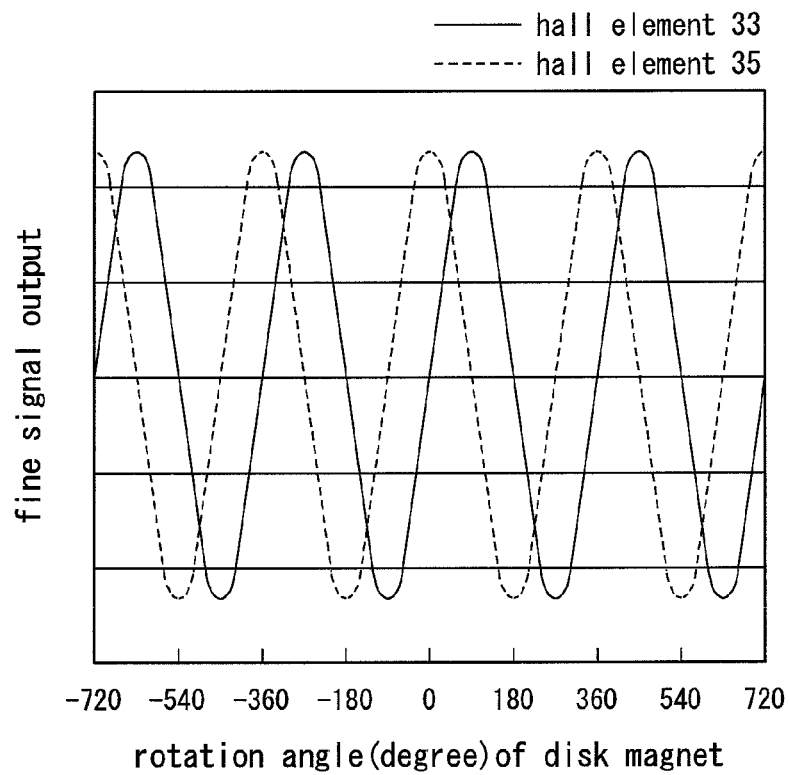
FIG. 7 is a graph showing a fine signal in the embodiments.
Figure 8:
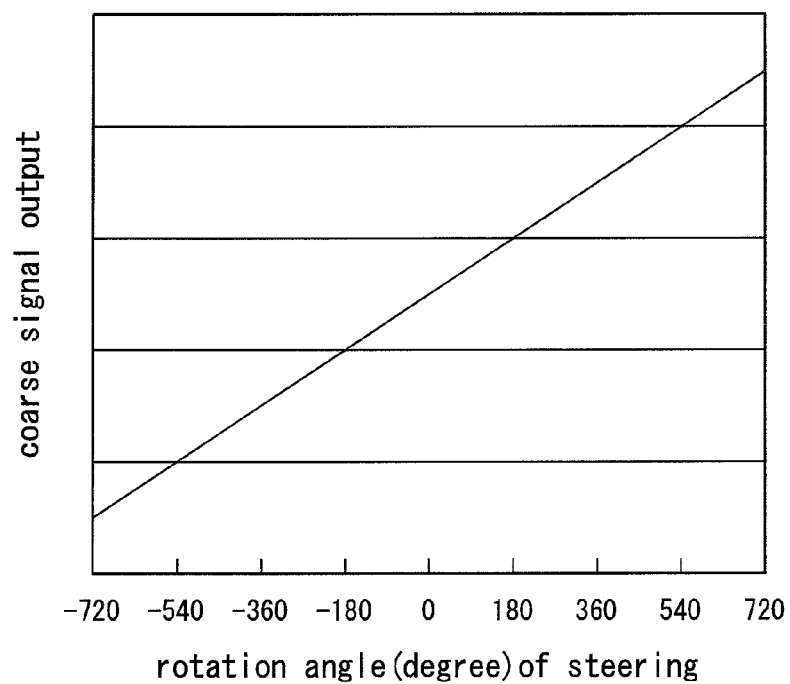
FIG. 8 is a graph showing a coarse signal in the embodiments.
Figure 9:
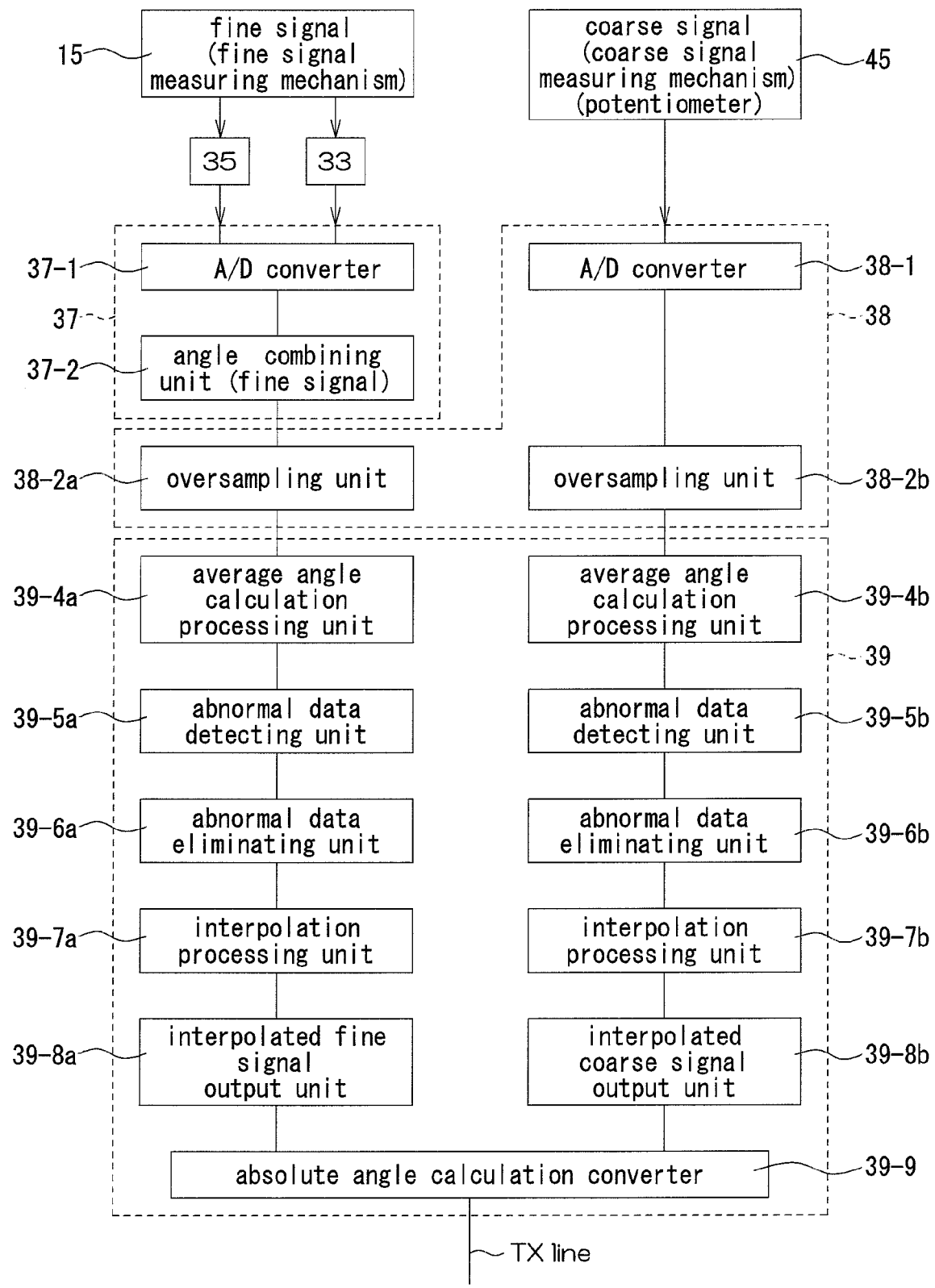
FIG. 9 is a block diagram showing oversampling units, a calculating mechanism and the vicinity thereof in the embodiments.
Figure 10:
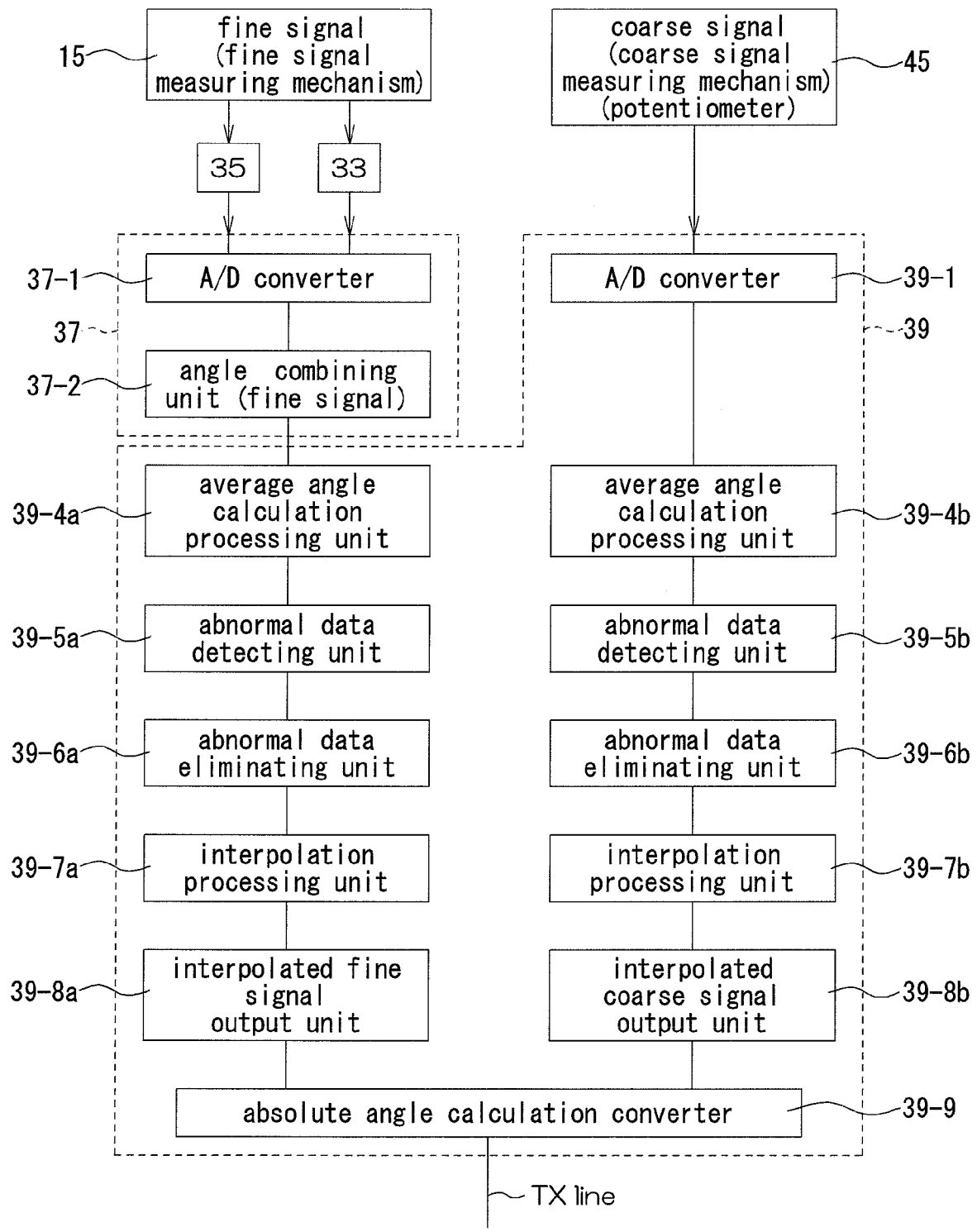
FIG. 10 is a block diagram in the case of not providing an oversampling unit.
Figure 11:
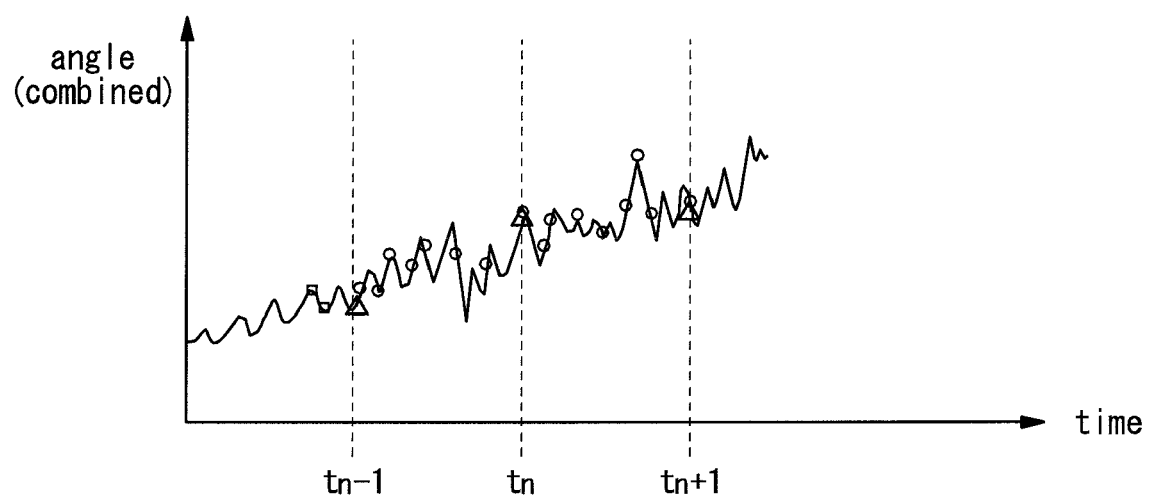
FIG. 11 is a view for explaining the pair of oversampling units of FIG. 9.
Figure 12:
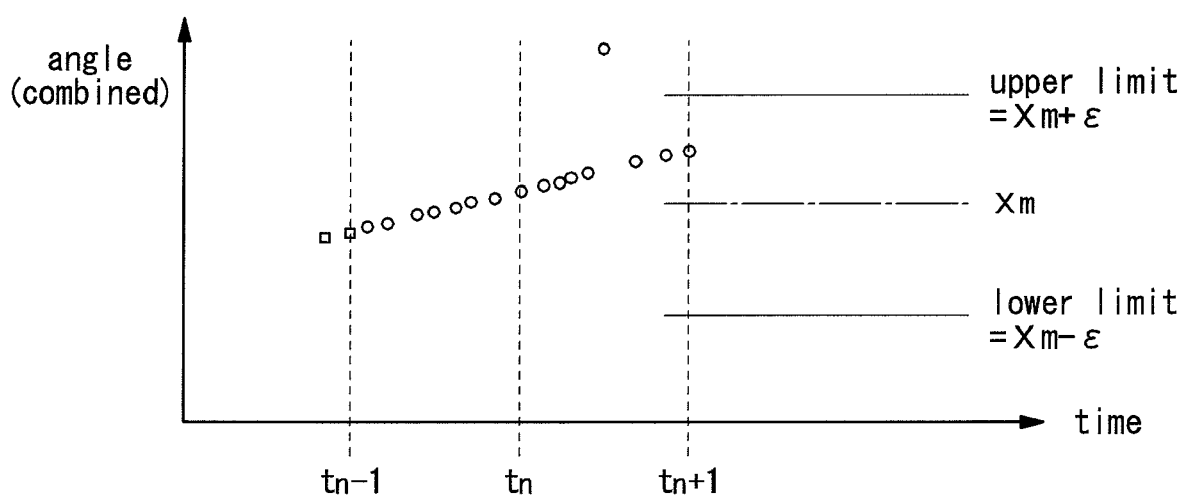
FIG. 12 is a view for explaining a pair of abnormal data detecting units and a pair of abnormal data eliminating units of FIG. 9.
Figure 13:
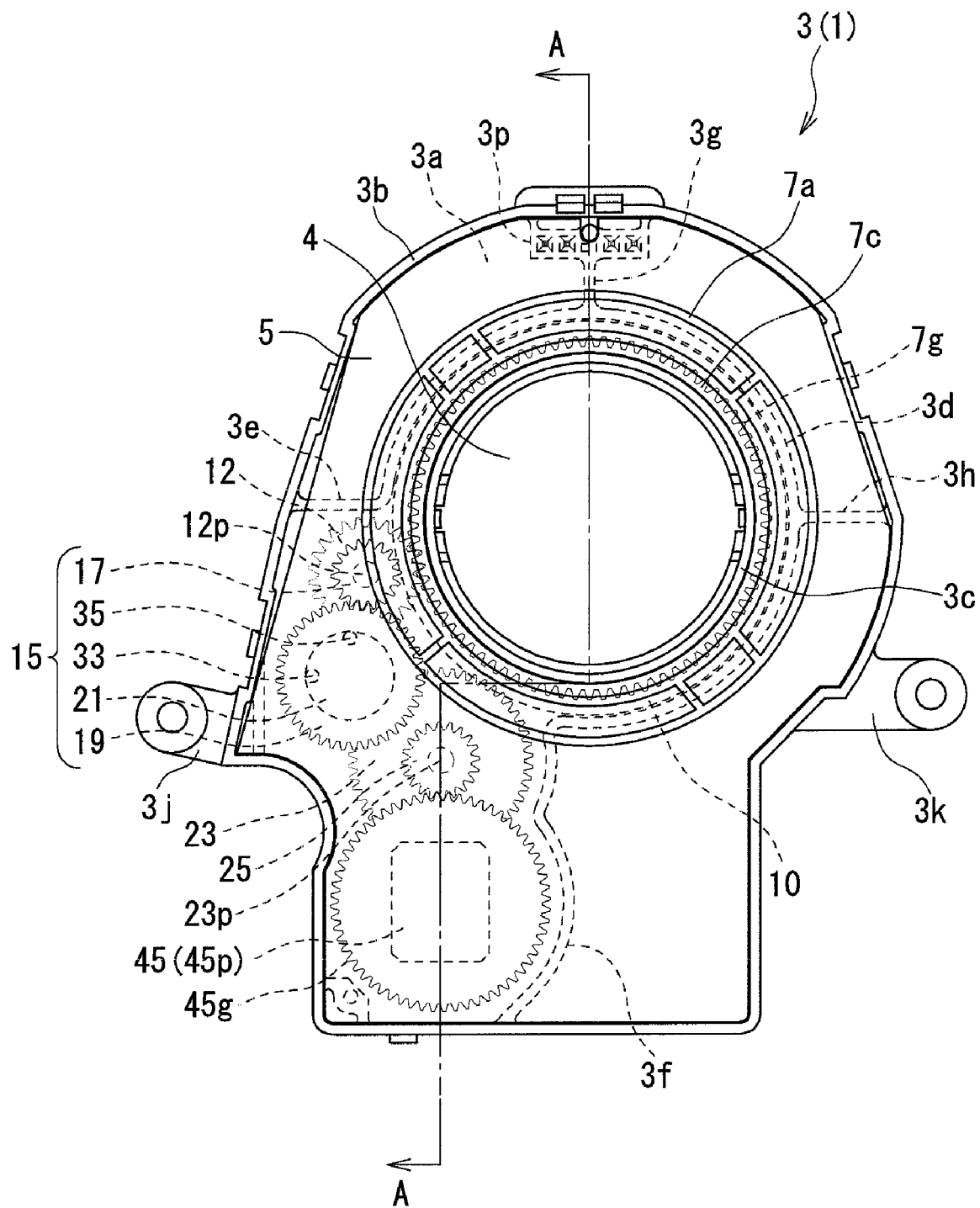
FIG. 13 is a plan view of the rudder angle sensor in embodiment 2.
Figure 14:
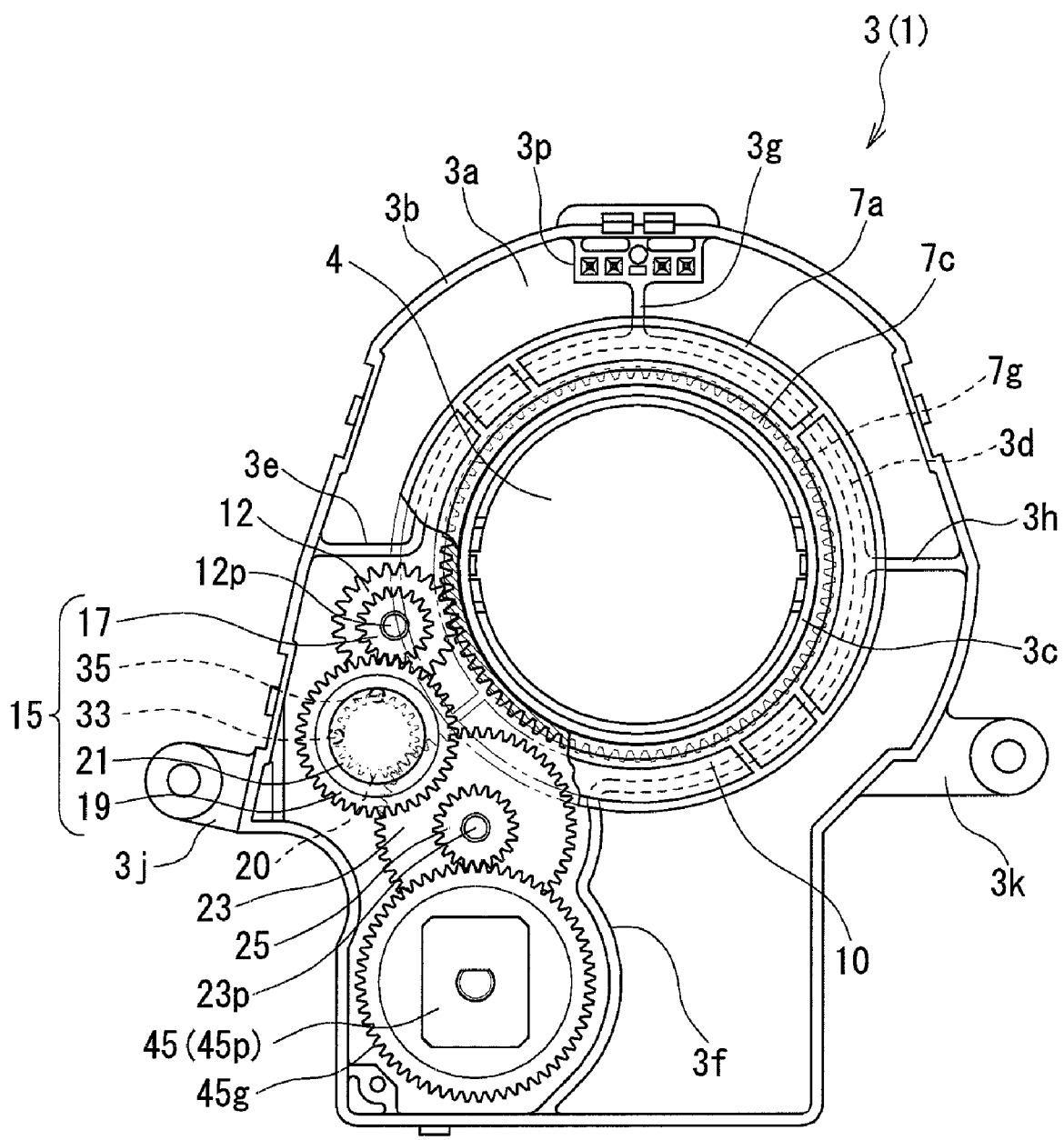
FIG. 14 is a plan view of a state that a supporting substrate for the rudder angle sensor shown in FIG. 13 is removed.
Figure 15:
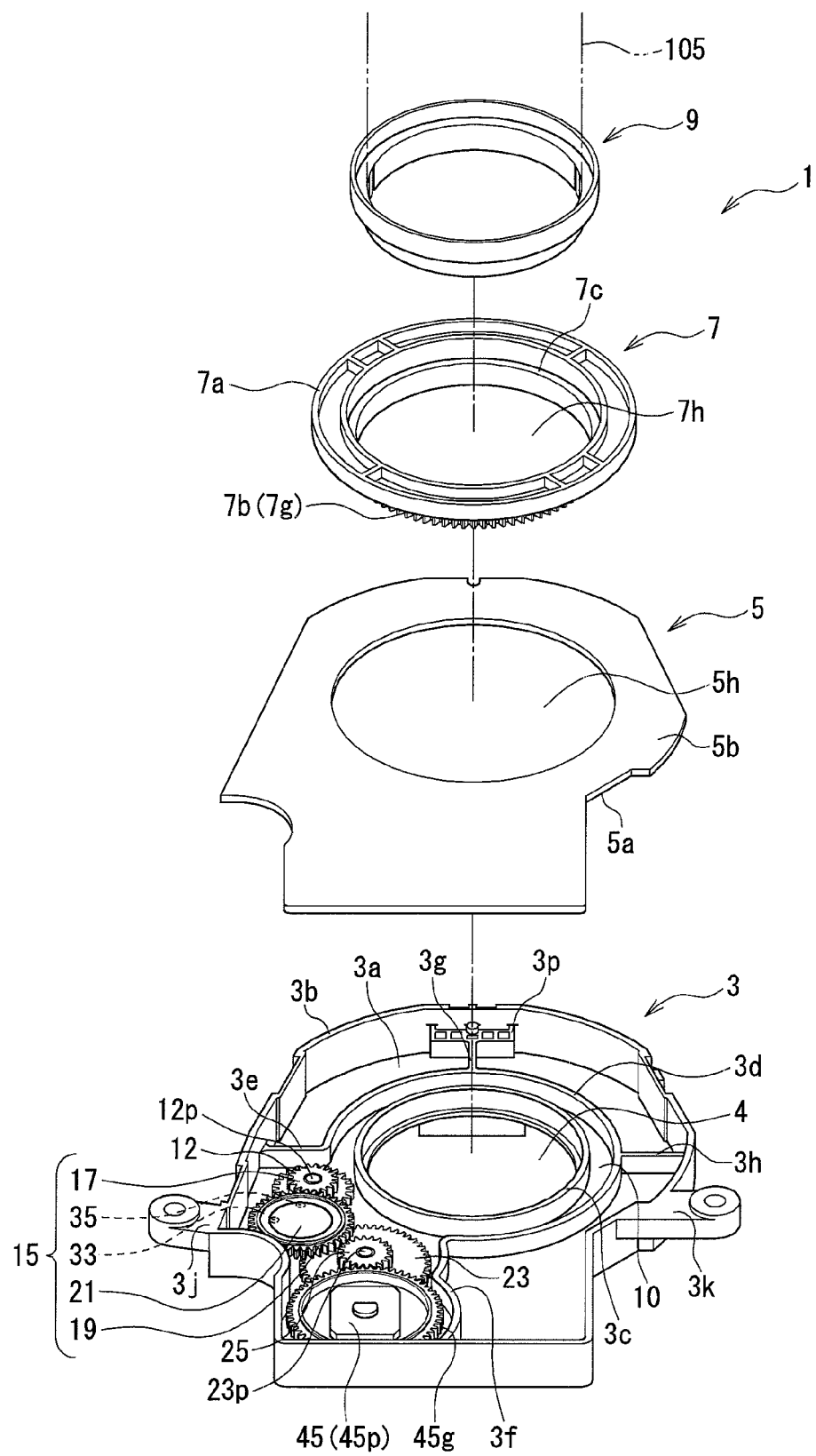
FIG. 15 is an exploded perspective view of the rudder angle sensor in the embodiment 2.
Figure 16:
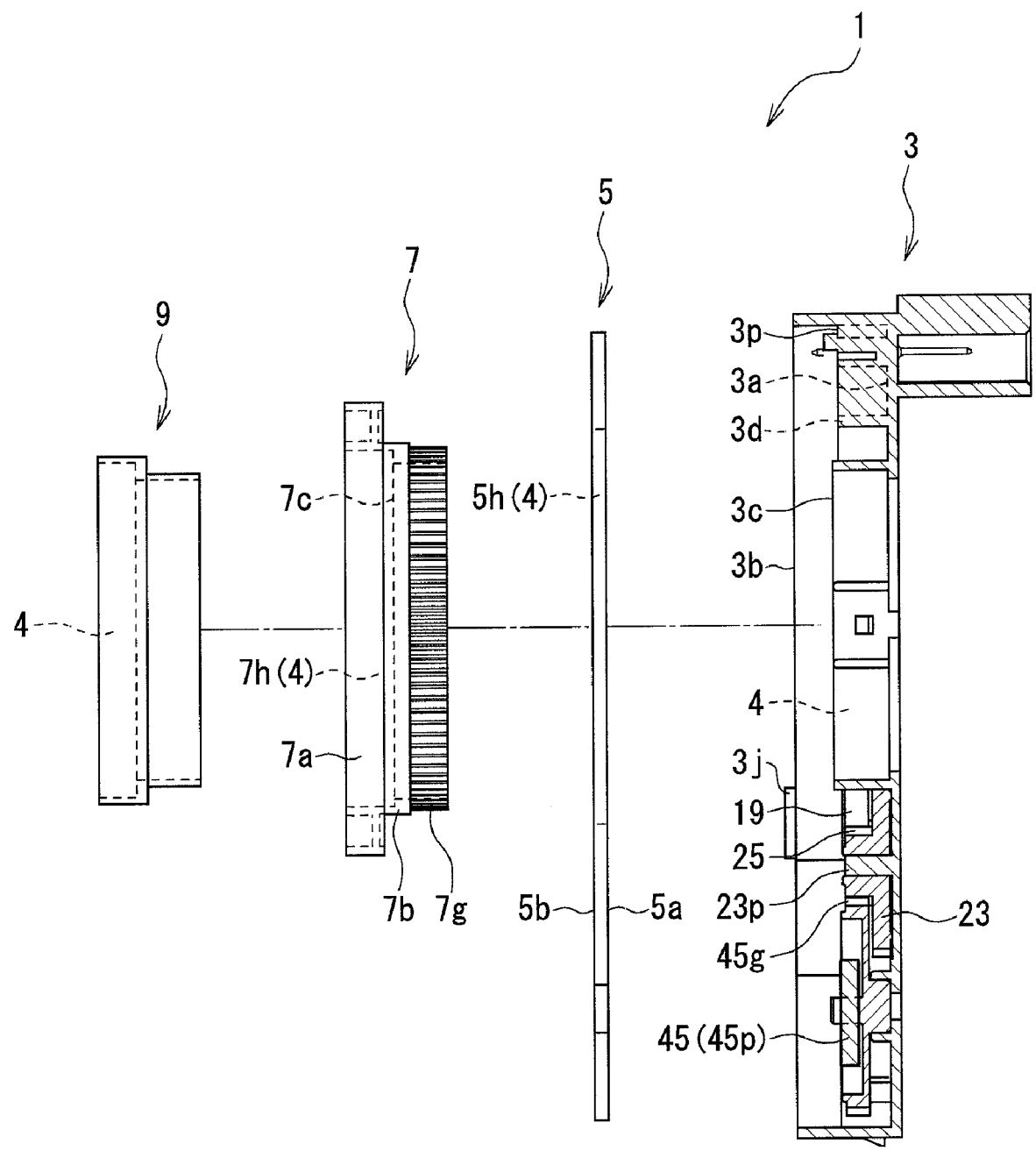
FIG. 16 is a cross-sectional view taken along the A-A line on the rudder angle sensor shown in FIG. 13.

FIG. 1 is a perspective view for showing an overview of an attaching position of a rudder angle sensor in the embodiment 1. Note that FIG. 1 is also a perspective view for showing an overview of an attaching position of a rudder angle sensor in the embodiment 2 which will be described later. FIG. 2 is a plan view of the rudder angle sensor in the embodiment 1. FIG. 3 is a plan view of a state that a supporting substrate of the rudder angle sensor shown in FIG. 2 is removed. FIG. 4 is an exploded perspective view of the rudder angle sensor in the embodiment 1. FIG. 5 is a cross-sectional view taken along the A-A line on the rudder angle sensor shown in FIG. 2. Note that FIG. 5 shows not a cross section but a side view of a rotation ring and a fixing ring. FIG. 6 is a block diagram showing an electrical structure of the rudder angle sensor in the embodiment 1. FIG. 7 is a graph showing a fine signal in the embodiment 1. FIG. 8 is a graph showing a coarse signal in the embodiment 1. FIG. 9 is a block diagram showing oversampling units, a calculating mechanism and the vicinity thereof in the embodiment 1. FIG. 10 is a block diagram in the case of not providing an oversampling unit. FIG. 11 is a view for explaining the pair of oversampling units of FIG. 9. FIG. 12 is a view for explaining a pair of abnormal data detecting units and a pair of abnormal data eliminating units of FIG. 9. Note that the reference numeral 105 shown in FIG. 6 shows a steering shaft to be fitted with the rudder angle sensor when in use.

With reference to FIG. 1, an example of an attaching position of the rudder angle sensor will be explained. The rudder angle sensor 1 is generally provided inside a steering column 103 attached to a steering wheel 101 of a vehicle. To the steering wheel 101, a steering shaft 105 (refer to FIG. 4) which rotates integrally with the steering wheel 101 is fixed. The rudder angle sensor 1 is a sensor for detecting a steering shaft rotation angle of the steering shaft 105, and the rudder angle sensor 1 itself does not rotate but has a rotation ring 7, which will be described later, constructed to rotate integrally with the steering shaft 105.

(Schematic Structure of the Rudder Angle Sensor)

With reference to FIG. 2 to FIG. 5, a schematic structure of the rudder angle sensor will be described. The rudder angle sensor 1 includes a casing 3 made of synthetic resin, and the casing 3 forms a main appearance of the rudder angle sensor 1. The casing 3 is basically constituted of a bottom portion 3a and a peripheral wall portion 3b standing from a peripheral edge of the bottom portion 3a. The casing 3 can be formed in various shapes according to, for example, a difference in internal structure such as the size and the number of gears to be included, a difference in external structure such as an attaching environment where the rudder angle sensor 1 is attached, and so on, and includes a shaft hole 4 in a thickness direction for allowing the steering shaft 105 to pass through. The shaft hole 4 is in a circular shape, and on a peripheral edge thereof, an annular inside rib 3c standing in parallel to the peripheral wall portion 3b from the bottom portion 3a and a similarly annular outside rib 3d standing outside the inside rib 3c are formed. The outside rib 3d is formed in a shape with a part thereof being cut out, and one end of the outside rib 3d opened by cutting out is coupled to the peripheral wall portion 3b by a coupling rib 3e, and the other end of the opened outside rib 3d is coupled to the peripheral wall portion 3b by a coupling rib 3f. Furthermore, also between the coupling rib 3e and the coupling rib 3f, coupling ribs 3g, 3h for coupling the outside rib 3d to the peripheral wall portion 3b are formed.

The coupling ribs 3e, 3f, 3g, 3h are all formed with the same height as the outside rib 3d. In cooperation with the outside rib 3d and so on, the coupling ribs 3e, 3f, 3g, 3h serve a role to reinforce the casing 3 and to support from a lower side a supporting substrate 5 located thereon, and serve a role to form a space (the space surrounded by the coupling rib 3e, the coupling rib 3f, and the peripheral wall portion 3b) between the bottom portion 3a of the casing 3 and the supporting substrate 5 capable of housing a driven gear 12 and so on which will be described later, and so on. Note that the reference numerals 3j, 3k show attachment pieces, which are projected from a side of the casing 3 (in a direction perpendicular to the peripheral wall portion 3b) so that the rudder angle sensor 1 can be attached to a predetermined position. The reference numeral 3p shows a housing body formed by integrally molding with the casing 3 to house connection pins (not shown) for electrically connecting electronic parts and so on mounted on the supporting substrate 5 to the outside.

The supporting substrate 5 is formed in a shape (size) that occupies substantially the entire inside area of the casing 3 for effectively using the inside area. Accordingly, the supporting substrate 5 is formed in a shape substantially identical to and slightly smaller than the casing 3. In the supporting substrate 5, a circular support hole 5h which becomes concentric with the shaft 4 when being housed in the casing 3 is formed to penetrate. The support hole 5h is formed with a larger diameter than the shaft hole 4, and a peripheral edge thereof is formed to be mountable on the outside rib 3d and the coupling ribs 3e, 3f of the casing 3 for allowing supporting from a lower side thereof. When the supporting substrate 5 is mounted on the outside rib 3d and so on, an annular space 10, which is visible in a plan view, exists between the peripheral edge of the support hole 5h of the supporting substrate 5 and the inside rib 3c of the casing 3 (between the inside rib 3c and the outside rib 3d) (refer to FIG. 3). As shown in FIG. 4 and FIG. 5, the supporting substrate 5 includes an opposing surface 5a (surface on the right side in FIG. 5) opposing the bottom portion 3a of the casing 3, and an attaching surface 5b on the opposite side of the opposing surface 5a. On the supporting substrate 5, various types of electronic parts including parts shown in FIG. 6 are mounted properly except an area surrounding the support hole 5h included in the attaching surface 5b.

Based on FIG. 2 to FIG. 5, the rotation ring 7 will be explained. The rotation ring 7 is an annular member having a hollow portion 7h formed by integrally molding synthetic resin, and is basically constituted of an annular flange portion 7a and an annular wall portion 7b standing from one of surfaces of the annular flange portion 7a. The annular wall portion 7b is formed concentrically with the annular flange portion 7a and stands from the annular flange portion 7a, and thus has a smaller outside diameter than that of the annular flange portion 7a. In the rotation ring 7, a step portion 7c is formed to project on the hollow portion 7h side (refer to FIG. 4). The step portion 7c has a main role of preventing disengagement of a fixing ring 9 described next, when the fixing ring 9 is inserted therein. The fixing ring 9 is a fixing member for interlocking the steering shaft 105 with the rotation ring 7 to allow reversible rotation thereof, and is formed to be capable of being interposed therebetween and to be attachable thereto/detachable therefrom. In an outside peripheral surface of a tip end portion viewed from the annular flange portion 7a of the annular wall portion 7b, a gear portion 7g for enabling the rotation ring 7 to function as a main drive gear is formed. The annular wall portion 7b and the main drive gear 7g are formed to be capable of being inserted in the annular space 10 between the peripheral edge of the support hole 5h of the supporting substrate 5 and the inside rib 3c of the casing 3. It is needless to mention that the annular wall portion 7b and the main drive gear 7g inserted in the annular space 10 are similarly rotatable in a circumferential direction relative to the peripheral edge of the support hole 5h (outside rib 3d) and the inside rib 3c.

(Structures of Driven Gear and Fine Signal Measuring Mechanism)

With reference to FIG. 2 to FIG. 6, the driven gear and a fine signal measuring mechanism will be explained. The driven gear 12 is provided to be rotatable about a support pin 12p standing from the bottom portion 3a of the casing 3 (refer to FIG. 3) and to be capable of engaging with the main drive gear 7g. A speed increasing ratio between the main drive gear 7g and the driven gear 12 in the embodiment 1 is set to approximately 1:3.

The fine signal measuring mechanism 15 is basically constituted of a measuring small-diameter gear 17, a measuring driven gear 19 which engages with the measuring small-diameter gear 17 to be driven to rotate, a disk magnet 21 which is coaxial with and rotates integrally with the measuring driven gear 19 (refer to FIG. 3, FIG. 6), and a detection circuit 31 including hall elements 33, 35 for detecting a magnetic field of the disk magnet 21. The hall element 33 and the hall element 35 are disposed at positions which are shifted by about 90 degrees on a circumference whose center is in common with that of the disk magnet 21 (measuring driven gear 19) for detecting a magnetic field generated by the disk magnet 21 while rotating. The measuring small-diameter gear 17 is provided coaxially and integrally with the driven gear 12, and is constructed to be integrally rotatable with the driven gear 12 about the support pin 12p. Note that as will be described later, there are cases of providing an oversampling unit and not providing an oversampling unit in the fine signal measuring mechanism 15. In the case of providing an oversampling unit (refer to FIG. 9), the fine signal measuring mechanism 15 includes an A/D converter 37-1, an angle combining unit 37-2 and an oversampling unit 38-2a. In the case of not providing an oversampling unit (refer to FIG. 10), the above described A/D converter 37-1 and the angle combining unit 37-2 are included. Here, oversampling refers to excessive sampling performed more than once.

A signal inputted to a calculating mechanism via the hall elements 33, 35 from the fine signal measuring mechanism 15 is called a fine signal indicating a steering shaft rotation angle of the steering shaft 105 in the range of 0 degree to 360 degrees. Note that detection of the fine signal is also possible by a detection method other than the method by means of the above-described mechanism, and as such a detection method, there are methods using a MR element and a variable resistor for example.

(Detection Circuit and Coarse Signal Measuring Mechanism)

As shown in FIG. 6, the detection circuit 31 is constituted by including an angle converting circuit 37, a MPU 39, a reset IC 41, a E²PROM 43, a CAN transceiver 44 and a coarse signal measuring mechanism 45, besides the above-described hall element 33 and hall element 35. The angle converting circuit 37 is a circuit for converting detection signals with different phases obtained from the hall elements 33, 35 to a combined angle (refer to FIG. 7).

Other than controlling the entire rudder angle sensor 1, the MPU 39 functions as a calculating mechanism as will be described later. The reset IC 41 is an IC for preventing runaway of the MPU 39. The E²PROM 43 is a device for storing, for example, a correction value for correcting a phase displacement based on a back lash which occurs in engagement of the main drive gear 7g with the driven gear 12. The CAN transceiver 44 takes charge of a communication function to output a signal indicating a steering shaft rotation angle of the steering shaft 105 to the outside.

The coarse signal measuring mechanism 45 is a detecting member, a detecting mechanism, or the like for detecting in which direction (clockwise direction or counterclockwise direction) and how many times the steering shaft 105 (refer to FIG. 4) rotates, and there is no limitation on a member or mechanism to be adopted as long as it is capable of performing such detection, where a potentiometer is adopted in the embodiment 1 because it is relatively cheaper and can be expected to operate stably. The potentiometer outputs a signal substantially proportional to a rotation angle by rotating. The signal outputted by the coarse signal measuring mechanism 45 is generally referred to as a coarse signal, and is a signal for determining a rotation angle of the steering shaft 105. An output signal of the coarse signal measuring mechanism 45 in the embodiment 1 shows a substantially linear characteristic as shown in FIG. 8. Specifically, the steering shaft 105 in the embodiment 1 is constructed to rotate four times as will be described later, and the coarse signal rotation mechanism 45 is constructed to rotate once while the steering shaft rotates four times. The rotation of the coarse signal measuring mechanism 45 is not necessary to be limited to once, which may be constructed to rotate plural times according to the situations. The coarse signal measuring mechanism 45 includes a gear unit 45g on the periphery thereof, and is rotated by a mechanism described next. Specifically, first, the rotation of the measuring driven gear 19 is as already explained, and the measuring driven gear 19 is provided with a transferring small-diameter gear 20 which rotates coaxially and integrally therewith. The transferring small-diameter gear 20 is located on a rear side of the measuring driven gear 19 shown in FIG. 3, and thus is shown by a dashed line on this drawing. The transferring small-diameter gear 20 is constructed to engage with an intermediate large-diameter gear 23 supported rotatably by a support pin 23p as a driving wheel to rotate this gear. The intermediate large-diameter gear 23, which rotates as a driven gear by the transferring small-diameter gear 20, makes an intermediate small-diameter gear 25 to rotate integrally, which is coaxially integrated with the intermediate large-diameter gear 23, and the intermediate small-diameter gear 25 makes a gear unit 45g engaging therewith, namely the coarse signal measuring mechanism 45, to rotate. By combining a coarse signal outputted by the above-described structure and the aforementioned fine signal (hereinafter, a rotation according to a fine signal is referred to as "fine rotation") showing an angle in the range of 0 degree to 360 degrees, a rotation angle of the steering shaft 105 can be detected. Note that as will be described later, there are cases of providing an oversampling unit and not providing an oversampling unit in the coarse signal measuring mechanism 45. In the case of providing an oversampling unit (refer to FIG. 9), the coarse signal measuring mechanism 45 includes an A/D converter 38-1 and an oversampling unit 38-2b. In the case of not providing the oversampling unit (refer to FIG. 10), the coarse signal measuring mechanism 45 includes an A/D converter 39-1.

A relationship between the coarse signal and the fine signal will be explained with a specific example. Here, the steering shaft 105 is assumed to be capable of rotating 720 degrees in each of clockwise and counterclockwise directions (−720 degrees to +720 degrees). Thus, there are 4.0 rotations (720 degrees×2÷360 degrees) from an end of the clockwise rotation to an end of the counterclockwise rotation. Further, a rotation angle (rotation angle of a fine rotation) within one of the four rotations is assumed to be, for example, 15 degrees clockwise (+15 degrees). When there is a fine signal, it is possible to know that the steering shaft 105 has rotated by +15 degrees, but it is not possible to further know which one of the four rotations this fine rotation of +15 degrees belongs to. It is not possible to distinguish whether it is a fine rotation of +15 degrees within 360 degrees of the first rotation or similarly a fine rotation of +15 degrees within 360 degrees of the second rotation in the four rotations. Accordingly, there is provided a structure capable of properly determining which one of the four rotations this fine rotation belongs to and what the degree of the fine rotation is by combining the coarse signal and the fine signal. Note that the rotatable angle of the steering shaft is not limited to the above-described 720 degrees, and a change in setting as necessary is not restricted. For example, the rotatable angle may be 790 degrees as in an embodiment 2 which will be described later.

(Measurement of Absolute Angle of Steering Shaft)

With reference to FIG. 9 and FIG. 10, a flow of measuring a steering shaft rotation angle (absolute angle) of the steering shaft 105 using the combination of the fine signal and the coarse signal will be explained. In the embodiment 1, for increasing accuracy of measurement as much as possible, a fine signal obtained via the hall elements 33, 35 from the fine signal measuring mechanism 15 and a coarse signal obtained from the coarse signal measuring mechanism (potentiometer) 45 are processed as follows. Further, specific structures of the angle converting circuit 37 and the MPU 39 will be explained together. Specifically, the angle converting circuit 37 constituting a part of the detection circuit 31 includes an A/D converter 37-1 for converting two analog amounts with different phases related to fine signals obtained via the hall elements 33, 35 to digital amounts, and an angle combining unit 37-2 which combines the two digital amounts with different phases into a fine signal (combined signal).

The MPU 39 which also functions as a calculating mechanism is basically constituted of a fine signal processing system which processes a fine signal, a coarse signal processing system which processes a coarse signal, an absolute angle calculation converter 39-9 shared by the fine signal processing system and the coarse signal processing system, and an A/D converter 38-1 provided only in the coarse signal processing system. The A/D converter 38-1 has a function to convert a coarse signal (analog amount) outputted by the coarse signal measuring mechanism 45 to a digital amount. Hereinafter, explanations will be given in the order of the fine signal processing system (coarse signal processing system) and the absolute angle calculation converter. Note that although there is a difference of the coarse signal and the fine signal, there is no difference between the structure of the coarse signal processing system and the structure of the fine signal processing system. Therefore, in explanation of the structure of the fine signal processing system, component names or the like for the coarse signal processing corresponding to component names or the like for the fine signal processing are merely described in parentheses described following the component names or the like for the fine signal processing in the next part, whereby explanations of components for the coarse signal processing are omitted to a possible extent.

Specifically, the MPU 39 (calculating mechanism) includes, as the fine signal processing system (coarse signal processing system), an average angle calculation processing unit 39-4*a* (average angle calculation processing unit 39-4*b*), an abnormal data detecting unit 39-5*a* (abnormal data detecting unit 39-5*b*), an abnormal data eliminating unit 39-6*a* (abnormal data eliminating unit 39-6*b*), a data interpolation processing unit 39-7*a* (data interpolation processing unit 39-7*b*), and an interpolated fine signal output unit 39-8*a* (interpolated coarse signal output unit 39-8*b*).

As described in the above (structures of driven gear and fine signal measuring mechanism) section, there are cases of providing an oversampling unit and not providing an oversampling unit in the fine signal measuring mechanism 15. Accordingly, the case of providing an oversampling unit is explained (refer to FIG. 9), and then the case of not providing an oversampling unit is explained (refer to FIG. 10). Note that the reason of providing an oversampling unit in both the processing systems, the fine signal processing system and the coarse signal processing system, is that the accuracy of the rudder angle sensor 1 can be drastically improved by oversampling not only the fine signal which requires higher accuracy but also the coarse signal. Therefore, only the fine signal processing system will be explained below.

In the case of providing the oversampling unit 38-2*a* in the fine signal processing system (refer to FIG. 9), the oversampling unit 38-2*a* has a function to attain excessive measurement data (fine signal excessive measurement data) regarding the fine signal obtained from the angle combining unit 37-2 in such a manner that measurement data is obtained eight times constantly between times $t_n-1$ and $t_n$ (eight times of measurement at positions "O" between $t_n-1$ and $t_n$, eightfold oversampling) where normally measurement data is obtained once (one time of measurement at position "Δ" on the $t_n$ axis) as shown in FIG. 11. As described above, the oversampling in the embodiment 1 is set to eightfold of normal sampling. This setting is obtained as a result of repeated evaluation experiments and is not for restricting a change of setting as necessary. Note that similar processing is performed between times $t_n$ to $t_n+1$.

The average angle calculation processing unit 39-4*a* has a function to perform calculation processing of an average angle Xm from fine signal measurement data obtained from the oversampling unit 38-2*a*. The abnormal data detecting unit 39-5*a* has a function to detect abnormal data deviated from a predetermined range in the average angle Xm of the fine signal measurement data. The abnormal data eliminating unit 39-6*a* has a function to eliminate abnormal data detected by the abnormal data detecting unit 39-5*a*. The data interpolation processing unit 39-7*a* has a function to interpolate data selected from the measurement data as a substitute for the abnormal data. The interpolated fine signal output unit 39-8*a* has a function to output an interpolated fine signal.

Upon reception of a sampling curve (FIG. 11) consists of actual measurement values of a detected signal, the abnormal data detecting unit 39-5*a* detects abnormal data for each of the coarse signal and the fine signal. A sampling curve in the case where the measurement data deviate from the range of the upper limit Xm+ε to the lower limit Xm−ε (predetermined range) of the average value Xm is shown in FIG. 12. As a result, a projected portion of the sampling curve is detected by the abnormal data detecting unit 39-5*a*, and the detected abnormal data is eliminated by the abnormal data eliminating unit 39-6*a*. The structure of the fine signal processing system is as described above, and the fine signal processing system and the coarse signal processing system basically have the same function, although there is a difference of the fine signal and the coarse signal. This point is as described above. Therefore, the above explanation of the fine signal processing system applies as it is to the coarse signal processing system by replacing the fine signal with the coarse signal.

As a substitute for abnormal data eliminated from the measurement data, the data interpolation processing units (interpolation processing units) 39-7*a*, 39-7*b* select a predetermined data row based on measurement data immediately before or after the eliminated abnormal data for example, and obtains an average value of the data row. This is because the effect of oversampling can be maximized by compensating the amount missed by the elimination with the average value.

As shown in FIG. 10, in the case where the oversampling unit is not provided in the fine signal processing system, namely, detection and elimination is performed without oversampling, whether it is abnormal data or not is detected as follows. For example, when measurement is performed at time $t_n$, the average angle calculation processing unit 39-4a calculates the average value Xm of measurement data constantly at predetermined time intervals ($t_n-1$ to $t_n-k$, for example k=5) before $t_n$. Next, with reference to the Xm, whether it is abnormal data or not deviating from the predetermined range is detected in the abnormal data detecting unit 39-5a. When the data has abnormality, the abnormal data eliminating unit 39-6a eliminates the data, and as a substitute for the eliminated data, selected data is interpolated in the data interpolation processing unit 39-7a. The interpolated data is outputted from the interpolated fine signal output unit 39-8a. As above, in the case of providing the oversampling unit and the case of not providing the oversampling unit, data to be selected in the data interpolation processing unit is different. The following applies to both the case of providing the above-described oversampling unit and the case of not providing the oversampling unit.

Note that as an interpolation method different from the above interpolation method, there is a method using average data. Specifically, when an actual value of abnormal data deviates from the predetermined range of the upper limit Xm+ϵ to the lower limit Xm−ϵ, the data interpolation processing unit 39-7a (data interpolation processing unit 39-7b) can perform calculation and interpolation simply and instantly, with the generated time of the abnormal data being ti, by an average value of data at ti−1 immediately before and at ti+1 immediately after (data at ti−1+data at ti+1 immediately thereafter)/2. In this manner, as a result of interpolating the sampling curve by a prediction function of prediction values (linear function y=ax+b (a, b are constants, horizontal axis x is time, and vertical axis y is angle)), data with quite high accuracy are measured.

The absolute angle calculation converter 39-9 has a function to calculate an interpolated fine signal outputted by the interpolated fine signal output unit 39-8a and an interpolated coarse signal outputted by the interpolated coarse signal output unit 39-8b and calculate an absolute angle of the steering shaft based on a measurement result thereof. Specifically, the interpolated fine signal and the interpolated coarse signal are both inputted to the absolute angle calculation converter 39-9, where both the signals are converted to the absolute angle of the steering shaft. The calculated steering shaft rotation angle is transmitted to the CAN transceiver 44 via a TX line.

The embodiment 1 is not limited to the above-described example, where various changes and modifications can be conceived. For example, when interpolating measurement data, the prediction function of a predicted value is not limited to one approximating to a straight line of linear function, where interpolation may be carried out with the prediction function approximating to a curve of quadratic or higher order polynomial. This case is beneficial when the number of abnormal data is large, and it is possible to increase accuracy by obtaining a sampling curve, which is interpolated by obtaining a prediction function (approximating function) of a prediction value with a least squares method, a spline approximation or the like.

Embodiment 2

Figure 17:
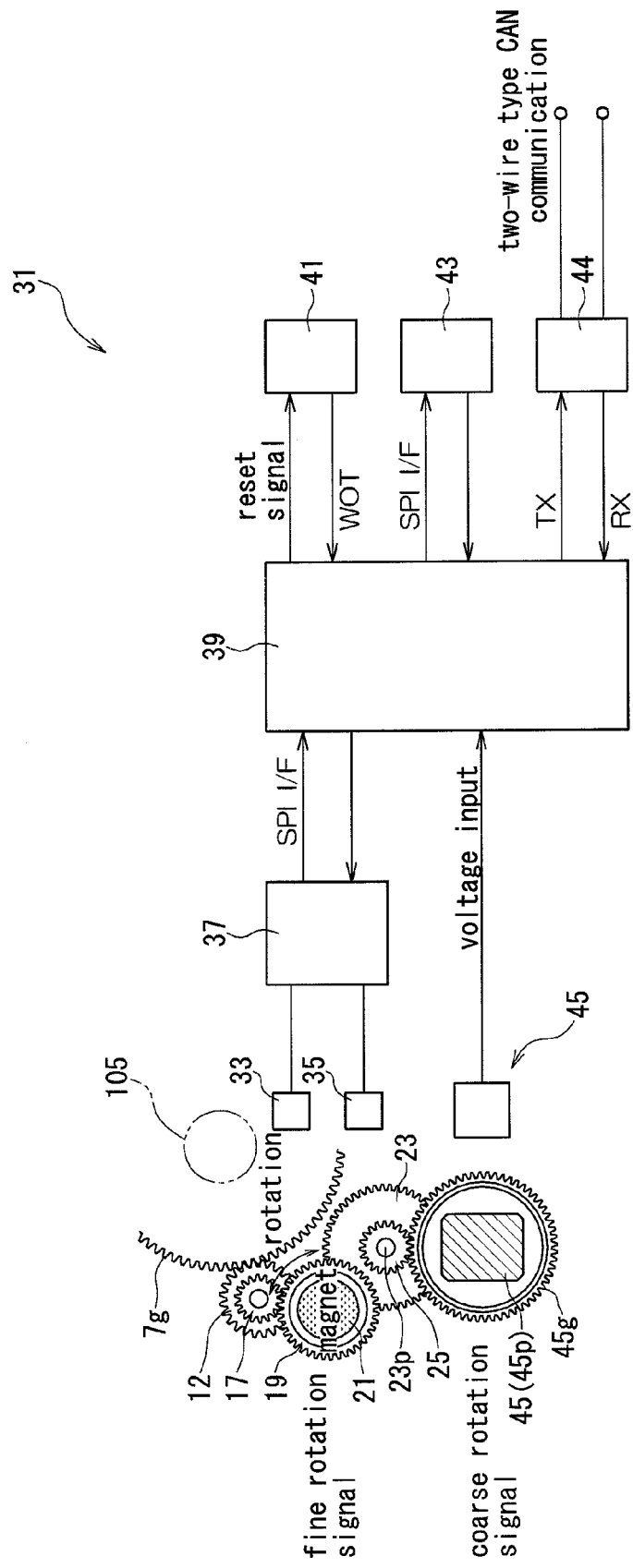
FIG. 17 is a block diagram showing an electrical structure of the rudder angle sensor in the embodiment 2.
Figure 18:
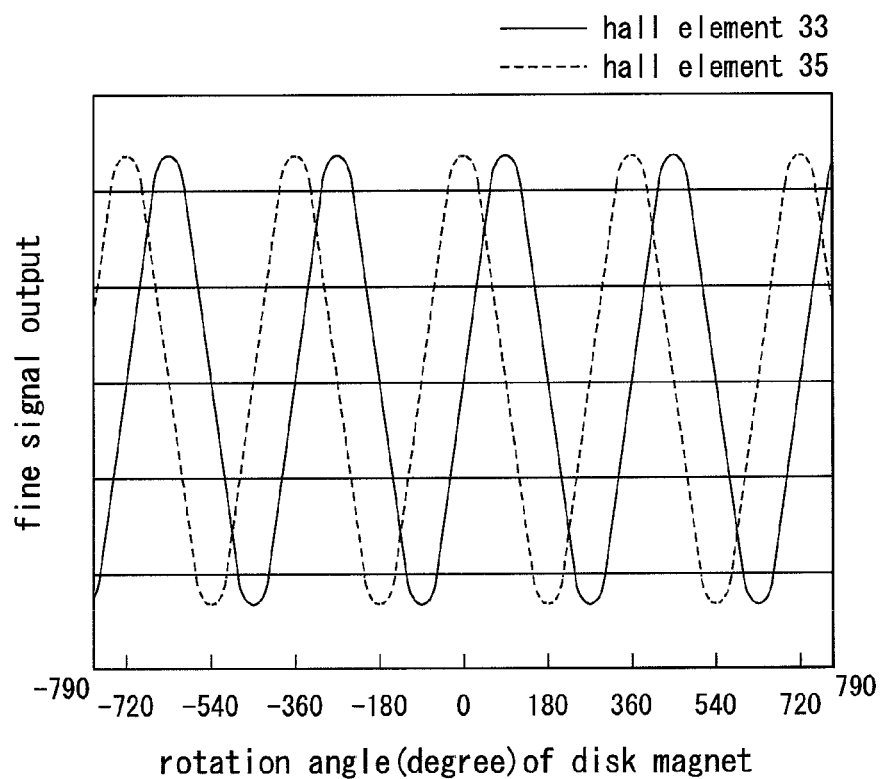
FIG. 18 is a graph showing a fine signal in the embodiment 2.
Figure 19:
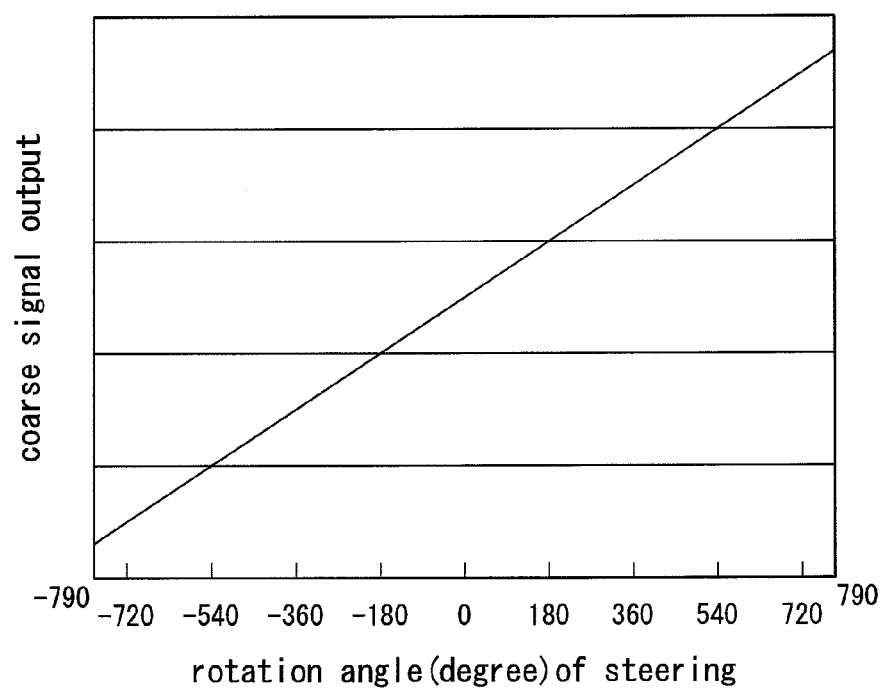
FIG. 19 is a graph showing a coarse signal in the embodiment 2.
Figure 20:
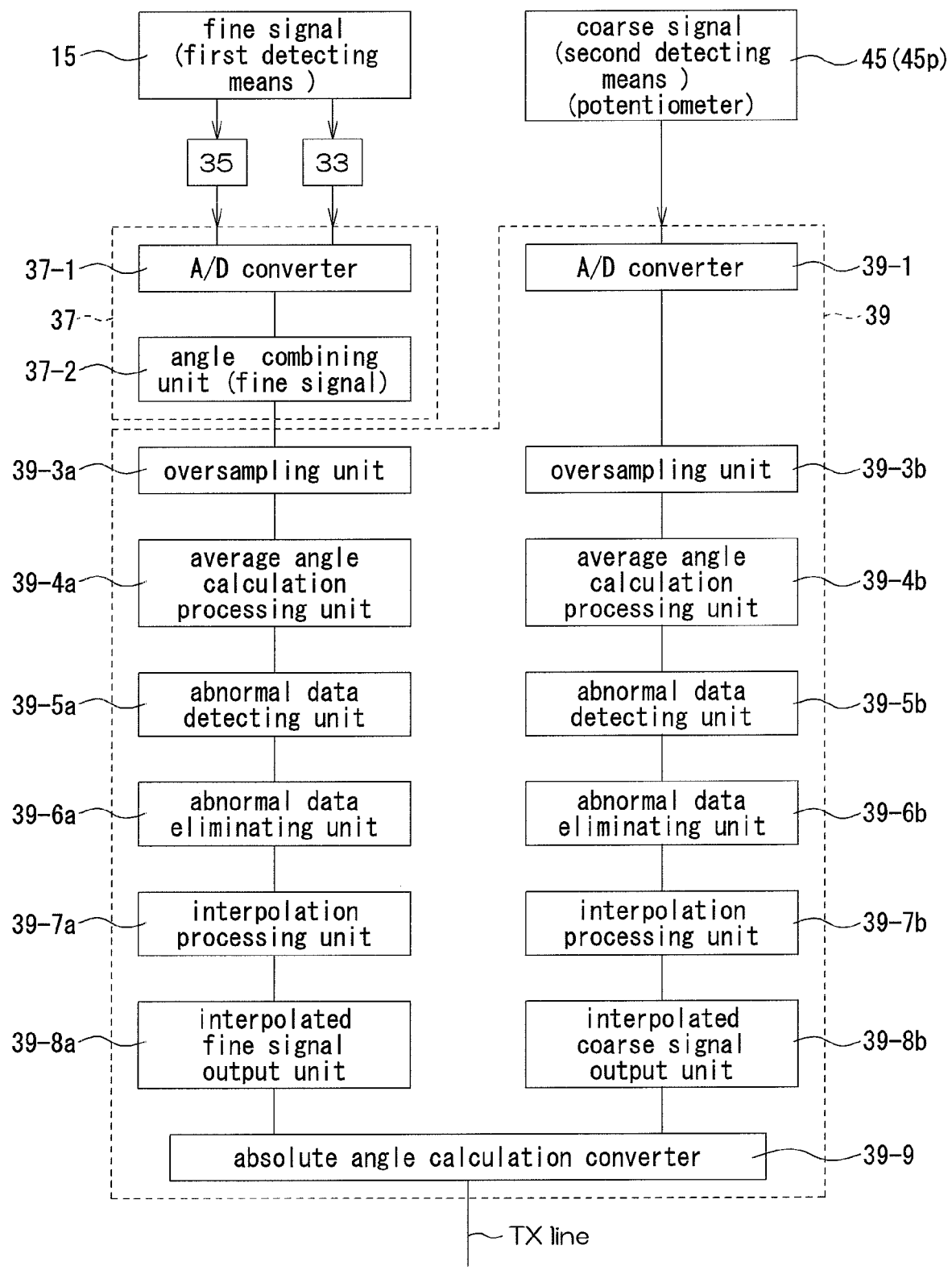
FIG. 20 is a block diagram showing oversampling units, a calculating mechanism and the vicinity thereof in the embodiment 2.

With reference to FIG. 18 to FIG. 21, embodiment 2 will be described. For describing the embodiment 2, the drawings for the embodiment 1, FIG. 1 and FIG. 10 to FIG. 12 are used as they are. Further, for FIG. 2 to FIG. 6 used for explaining the embodiment 1, FIG. 13 to FIG. 17 are made to correspond to these drawings, respectively. This is because reference numeral 45p is further added for explaining the embodiment 2. Moreover, FIG. 18 to FIG. 20 are added for explanation. Note that FIG. 18 is a graph showing a fine signal in the second embodiment. FIG. 19 is a graph showing a coarse signal in the embodiment 2. FIG. 20 is a block diagram showing a calculating mechanism and the vicinity thereof in the embodiment 2.

Hereinafter, there may be duplication with the explanation of the above embodiment 1, but explanation thereof will be given again by way of confirmation.

As shown in FIG. 1, the rudder angle sensor 1 is generally provided inside a steering column 103 attached to a steering wheel 101 of a vehicle. To the steering wheel 101, a steering shaft 105 (refer to FIG. 4) which rotates integrally with the steering wheel 101 is fixed. The rudder angle sensor 1 is a sensor for detecting a steering shaft rotation angle of the steering shaft 105, and the rudder angle sensor 1 itself does not rotate but has a rotation ring 7, which will be described later, constructed to rotate integrally with the steering shaft 105. This point is the same as in the embodiment 1.

(Schematic Structure of the Rudder Angle Sensor)

As shown in FIG. 13 to FIG. 17, a schematic structure of the rudder angle sensor in the embodiment 2 is as follows. Specifically, the rudder angle sensor 1 has a casing 3 made of synthetic resin, and the casing 3 forms a main appearance of the rudder angle sensor 1. The casing 3 is basically constituted of a bottom portion 3a and a peripheral wall portion 3b standing from a peripheral edge of the bottom portion 3a. This point is the same as in the schematic structure of the rudder angle sensor 1 explained in the embodiment 1. Therefore, the explanation thereof is omitted here; refer to the explanation of the schematic structure of the embodiment 1 for details thereof.

As shown in FIG. 14 to FIG. 17, the supporting substrate 5 in the embodiment 2 is formed in a shape (size) that occupies substantially the entire inside area of the casing 3 for effectively using the inside area. Accordingly, the supporting substrate 5 is formed in a shape substantially identical to and slightly smaller than the casing 3. This point is the same as in the structure of the supporting substrate 5 explained in the embodiment 1. Therefore, the explanation thereof is omitted here; refer to the explanation of the supporting substrate 5 of the embodiment 1 for details thereof.

Based on FIG. 13 to FIG. 16, the rotation ring 7 (main drive gear 7) in the embodiment 2 will be explained. The rotation ring 7 is an annular member having a hollow portion 7h formed by integrally molding synthetic resin, and is basically constituted of an annular flange portion 7a and an annular wall portion 7b standing from one of surfaces of the annular flange portion 7a. This point is the same as in the structure of the rotation ring 7 explained in the embodiment 1. Therefore, the explanation thereof is omitted here; refer to the explanation in the embodiment 1 for details thereof. Note that the rotation ring 7 (main drive gear 7) in the embodiment 2 is disposed at substantially the center of the casing 3 to be reversibly rotatable according to manipulation of the steering shaft 105.

(Structures of Driven Gear and First Detecting Means)

With reference to FIG. 13 to FIG. 17, the driven gear and a first detecting means (fine signal measuring mechanism) will be explained. The driven gear 12 is provided to be rotatable about a support pin 12p standing from the bottom portion 3a of the casing 3 (refer to FIG. 14) and to be capable of engaging with the gear unit 7g (main drive gear 7g) Note that a speed increasing ratio between the main drive gear 7 (gear unit 7g) and the driven gear 12 is set to approximately 1:3. This point is the same as in the embodiment 1.

The first detecting means (fine signal measuring mechanism) 15 is basically constituted of a measuring small-diameter gear 17, a fine signal gear (measuring driven gear) 19 which engages with the measuring small-diameter gear 17 to be driven to rotate, a disk magnet 21 which is coaxial with and rotates integrally with the fine signal gear (measuring driven gear) 19 (refer to FIG. 14, FIG. 17), and a detection circuit 31 including hall elements 33, 35 for detecting a magnetic field of the disk magnet 21. A second detecting means which will be described later includes no magnet, and thus a yoke is not provided therein. The hall element 33 and the hall element 35 are disposed at positions which are shifted by about 90 degrees on a circumference whose center is in common with that of the disk magnet 21 (fine signal gear 19 (measuring driven gear 19)) for detecting a magnetic field generated by the disk magnet 21 while rotating. Specifically, from the two hall elements 33, 35 for a fine signal, as shown in FIG. 18, two output waveforms having phases displaced by 90 degrees are obtained. These waveforms are equivalent to a SIN wave and a COS wave, respectively. The respective outputs are obtained in voltage waveforms of Vsin, Vcos, and by calculating arctan (Vsin/Vcos) from these outputs, the rotation angle of the fine signal gear 19 is obtained. However, when viewed from the fine signal gear 19, these angles are repetitively outputted by every 360 degrees, and this itself does not enable to determine what the number of rotations is. The measuring small-diameter gear 17 is provided coaxially and integrally with the driven gear 12, and is constituted to be integrally rotatable with the driven gear 12 about the support pin 12p. Specifically, the driven gear 12 is arranged to be reversibly rotatable according to manipulation of the steering shaft 105. Thus, the main drive gear 7 and the fine signal gear 19 are interlocked to rotate. Note that the gear ratio between the man drive gear 7 and the fine signal gear 19 is set to 2. Note that as will be described later, there are cases of providing an oversampling unit and not providing an oversampling unit in the first detecting means (fine signal measuring mechanism) 15. In the case of providing an oversampling unit (refer to FIG. 20), the first detecting means (fine signal measuring mechanism) 15 includes the aforementioned A/D converter 37-1, angle combining unit 37-2 and oversampling unit 39-3a. In the case of not providing an oversampling unit (refer to FIG. 10), the first detecting means includes the aforementioned A/D converter 37-1 and angle combining unit 37-2.

A signal inputted to a calculating mechanism via the hall elements 33, 35 from the first detection means (fine signal measuring mechanism) 15 is called a fine signal indicating a steering shaft rotation angle of the steering shaft 105 in the range of 0 degrees to 360 degrees.

(Detection Circuit and Second Detecting Means)

As shown in FIG. 17, the detection circuit 31 is constituted by including an angle converting circuit 37, a MPU 39, a reset IC 41, a E²PROM 43, a CAN transceiver 44 and a second detecting means 45, besides the above-described hall element 33 and the hall element 35. The angle converting circuit 37 is a circuit for converting detection signals with different phases obtained from the hall elements 33, 35 to a combined signal (refer to FIG. 18).

Other than controlling the entire rudder angle sensor 1, the MPU 39 functions as a calculating mechanism as will be described later. The reset IC 41 is an IC for preventing runaway of the MPU 39. The E²PROM 43 is a device for storing, for example, a correction value for correcting a phase displacement based on a back lash which occurs in engagement of the main drive gear 7 (gear unit 7g (main drive gear 7g)) with the driven gear 12. The CAN transceiver 44 takes charge of a communication function to output a signal indicating a steering shaft rotation angle of the steering shaft 105 to the outside. This point is the same as in the embodiment 1.

The second detecting means 45 (coarse signal measuring mechanism (potentiometer)) is basically constituted of a potentiometer 45p, which is a detecting member, a detecting mechanism or the like for detecting in which direction (clockwise direction or counterclockwise direction) and how many times the steering shaft 105 (refer to FIG. 4) rotates, and a coarse signal gear 45g. As described above, there is no yoke. This is because it is not necessary to provide a ferromagnetic material since the second detecting means 45 includes no magnet. Therefore, the rudder angle sensor 1 which can be constructed with a less number of parts owing to the omission of the yoke can be provided. Moreover, since mutual interference due to the magnetism of a magnet does not occur, accuracy of a detection value of a rotation angle does not decrease, and thus it is possible to provide the rudder angle sensor 1 with high accuracy. The potentiometer 45p outputs a signal substantially proportional to a rotation angle by rotating. The signal outputted by the potentiometer 45p is generally referred to as a coarse signal, and is for determining a rotation angle of the steering shaft 105. For the coarse signal gear 45g, a gear ratio is set so as to rotate substantially once by the entire rotation range of the steering shaft. In the embodiment 2, the coarse signal gear 45g is adjusted so as to rotate substantially once by the entire rotation of the steering shaft, substantially 4.4 rotations (2.2 rotations in both left and right directions). The output of the potentiometer 45p is set so as to linearly change in the above range. In the embodiment 2, when viewed from the steering shaft, a shaft position for the potentiometer 45p is set so as to monotonically increase between −790 degrees as a left full rotation position and +790 degrees as a right full rotation position with a neutral point (straight direction) being 0 degree. FIG. 19 shows a coarse signal outputted by the potentiometer 45p, which shows a substantially linear characteristic. Note that the rotation of the coarse signal gear 45g is not necessary to be limited to once, which may be constructed to rotate plural times according to the situations. Note that as will be described later, there are cases of providing an oversampling unit and not providing an oversampling unit in the second detecting means (coarse signal measuring mechanism) 45. In the case of providing an oversampling unit (refer to FIG. 20), the second detecting means 45 includes an A/D converter 39-1 and an oversampling unit 39-3b. In the case of not providing an oversampling unit (refer to FIG. 10), the second detecting means 45 includes the aforementioned A/D converter 39-1.

The potentiometer 45p includes the coarse signal gear 45g on the circumference thereof and is rotated by a mechanism described below. Specifically, first, for the rotation of the fine signal gear 19, there is provided a transferring small-diameter gear 20 which rotates coaxially and integrally therewith. The transferring small-diameter gear 20 is located on a rear side of the fine signal gear 19 shown in FIG. 14, and thus is shown by a dashed line on this drawing. The transferring small-diameter gear 20 is constructed to engage with an intermediate large-diameter gear 23 supported rotatably by a support pin 23p as a driving wheel to rotate this gear. The intermediate large-diameter gear 23, which rotates as a driven gear by the transferring small-diameter gear 20, makes an intermediate small-diameter gear 25 to rotate integrally, which is coaxially integrated with the intermediate large-diameter gear 23, and the intermediate small-diameter gear 25 makes a coarse signal gear 45g engaging therewith, namely the second detecting means 45, to rotate. The coarse signal gear 45g interlocks with the main drive gear 7 to rotate. By combining a coarse signal outputted by the above-described structure and the aforementioned fine signal (hereinafter, a rotation according to a fine signal is referred to as "fine rotation") showing an angle in the range of 0 degree to 360 degrees, a rotation angle of the steering shaft 105 can be detected.

A procedure for determining a current absolute angle of the steering shaft from a relationship between the fine signal and the coarse signal will be described with a specific example. As an assumption, first, the fine signal gear rotates with increasing speed by a gear ratio 2:1 with respect to the main drive gear which reversibly rotates by rotating the steering shaft. Further, it is assumed that the coarse signal gear rotates with decreasing speed of less than one rotation by the entire rotation range (+790 degrees to −790 degrees) of the main drive gear which reversibly rotates by rotating the steering shaft.

For example, it is assumed that a measurement value of the fine signal at a given rotation position of the steering shaft 105 is 123 degrees. This measurement value is calculated based on arctan (33 V/35 V) from voltage output values 33 V, 35 V of the two hall elements 33, 35 as described above. From only this measurement value, 123 degrees, of the fine signal, it is not possible to determine whether the fine signal gear 19 is rotating rightward or leftward from the neutral position. Moreover, it is also unknown how many times the fine signal gear has rotated from the neutral position. Note that in the embodiment 2, the gear ratio between the main drive gear 7 and the fine signal gear 19 is 2:1, it is possible to predict that the current rotation angle of the steering shaft is near 61.5 degrees (123/2), but it is still unknown that whether the rotation angle is of rightward rotation or leftward rotation and what the number of rotations is.

As described above, the data processing with the coarse signal enables to determine uniquely, although not as accurate as the fine signal data, whether the steering shaft 105 rotates rightward or leftward and how far it has rotated from the neutral position by measuring the output voltage of the potentiometer 45p included in the coarse signal gear 45g. In the embodiment 2, since the left full rotation position is at −790 degrees and the right full rotation position is +790 with the neutral of rotation of the steering shaft 105 being 0 degree, the potentiometer 45p shows a linear output voltage between the −790 degrees and +790 degrees. Here, explanation will be given below with such a set coarse signal output value being assumed to be 420 degrees. Note that even if accuracy of the output of the potentiometer 45p is more or less low, accuracy of a finally obtained absolute angle will not have a problem since the absolute angle θa is calculated by a combination mainly using the fine signal output as described below.

The determining procedure of the absolute angle θa of the steering shaft calculates as follows. Specifically, also in calculation by the MPU, when an integer n is obtained with which the absolute value of $[\theta c - \{\theta b/m + (360/m) \times n\}]$ is the minimum, where θb is the fine signal output, θc is the coarse signal output, and m is the gear ratio between the main drive gear and the fine signal gear, the absolute angle θa can be calculated by $\theta a = \theta b/m + (360/m) \times n$. For example, let us consider the case where an output value of the fine signal is 123° and an output value of the coarse signal is 420°. When applied to the above equation, a substituted equation $[420° - \{123°/2 \pm (360/2) \times n\}]$ is obtained. Here, since $\theta a = 123°/2 \pm (360/2) \times n$, when obtaining n with which the θa becomes closest to 420°, the θa at this time is the absolute angle to be obtained, and n/m is the number of rotations from the neutral position of the steering shaft 105. Here, ± in the above equation changes depending on the sign of the output value of the coarse signal, m is the gear ratio (2 in the embodiment 2), and n is a positive integer (n>=0). When the output value of the coarse signal is 420°, $\theta a = 61.5° + 180° \times n$. Therefore, θa becomes closest to 4200 when n=2, and the absolute angle θa at this time becomes $\theta a = 61.5° + 180° \times 2 = 421.5°$. Note that the actual steering shaft is at a position of rotating rightward once (n/m=2/2=1) and further rotated by 61.5° from the neutral position.

Further, when the output value of the fine signal is 23° and the output value of the coarse signal is 12°, similarly by $\omega = 12 - (11.5 + 180 \times n)$, n which makes the absolute value of ω minimum is n=0. It can be seen that the absolute value θa at this time is $\theta a = 11.5°$. It can be seen that the actual steering shaft 105 is at a position of rotating less than once and rotating rightward by 11.5°, since n/m=0.

Furthermore, as another example, when the output value of the fine signal is 37° and the output value of the coarse signal is −162 degrees, n=1 is obtained from $\theta a = 18.50 - 180° \times n$. The absolute angle θa becomes $\theta a = -161.5°$. Note that since n/m=0.5, the actual absolute angle θa of the steering shaft 105 is at a position of rotating leftward less than once by 161.5°.

(Measurement of Absolute Angle of Steering Shaft)

With reference to FIG. 10 to FIG. 20, a flow of measuring a steering shaft rotation angle (absolute angle) of the steering shaft 105 using the combination of the fine signal and the coarse signal will be explained. In the embodiment 2, for increasing accuracy of measurement as much as possible, a fine signal obtained via the hall elements 33, 35 from the first detecting means 15 and a coarse signal obtained from the second detecting means (potentiometer) 45 are processed as follows. Further, specific structures of the angle converting circuit 37 constituting a part of the detection circuit 31 and the MPU 39 will be explained together. Specifically, the angle converting circuit 37 includes the A/D converter 37-1 for converting two analog amounts with different phases related to fine signals obtained via the hall elements 33, 35 to digital amounts and the angle combining unit 37-2 which combines the two digital amounts with different phases into a fine signal (combined signal).

The MPU 39 which functions as a calculating mechanism is basically constituted of a fine signal processing system which processes a fine signal, a coarse signal processing system which processes a coarse signal, an absolute angle calculation converter 39-9 shared by the fine signal processing system and the coarse signal processing system, and an A/D converter 39-1 provided only in the coarse signal processing system. The A/D converter 39-1 has a function to convert a coarse signal (analog amount) outputted by the second detecting means 45 to a digital amount. Hereinafter, explanations will be given in the order of the fine signal processing system (coarse signal processing system) and the absolute angle calculation converter. Note that although there is a difference of the coarse signal and the fine signal, there is no difference between the structure of the coarse signal processing system and the structure of the fine signal processing system. Therefore, in explanation of the structure of the fine signal processing system, component names or the like for the coarse signal processing corresponding to component names or the like for the fine signal processing are merely described in parentheses described following the component names or the like for the fine signal processing in the next part, whereby explanations of components for the coarse signal processing are omitted to a possible extent.

Specifically, the MPU 39 includes, as the fine signal processing system (coarse signal processing system), an average angle calculation processing unit 39-4a (average angle calculation processing unit 39-4b), an abnormal data detecting unit 39-5a (abnormal data detecting unit 39-5b), an abnormal data eliminating unit 39-6a (abnormal data eliminating unit 39-6b), a data interpolation processing unit 39-7a (data interpolation processing unit 39-7b), and an interpolated fine signal output unit 39-8a (interpolated coarse signal output unit 39-8b).

As described in the above (structures of driven gear and first detecting means) section, there are cases of providing an oversampling unit and not providing an oversampling unit in the fine signal measuring mechanism 15. Accordingly, explanation will be given in the order of the case of providing an oversampling unit (refer to FIG. 9) and then the case of not providing an oversampling unit (refer to FIG. 10). Note that the reason of providing an oversampling unit in both the processing systems, the fine signal processing system and the coarse signal processing system, is that the accuracy of the rudder angle sensor 1 can be drastically improved by oversampling not only the fine signal which requires higher accuracy but also the coarse signal. Therefore, only the fine signal processing system will be explained below.

In the case of providing the oversampling unit 39-3a in the fine signal processing system, the oversampling unit 39-3a has a function to attain excessive measurement data (fine signal excessive measurement data) regarding the fine signal obtained from the angle combining unit 37-2 in such a manner that measurement data is obtained eight times constantly between times $t_n-1$ and $t_n$ (eight times of measurement at positions "0" between $t_n-1$ and $t_n$, eightfold oversampling) where normally measurement data is obtained once (one time of measurement at position "Δ" on the $t_n$ axis) as shown in FIG. 11. As described above, the oversampling in the embodiment 2 is set to eightfold of normal sampling. This setting is obtained as a result of repeated evaluation experiments and is not for restricting a change of setting as necessary. Note that similar processing is performed between times $t_n$ to $t_n+1$.

The average angle calculation processing unit 39-4a has a function to perform calculation processing of an average angle Xm from fine signal measurement data obtained from the oversampling unit 39-3a. The abnormal data detecting unit 39-5a has a function to detect abnormal data deviated from a predetermined range in the average angle Xm of the fine signal measurement data. The abnormal data eliminating unit 39-6a has a function to eliminate abnormal data detected by the abnormal data detecting unit 39-5a. The data interpolation processing unit 39-7a has a function to interpolate data selected from the measurement data and the excessive measurement data as a substitute for the abnormal data. The interpolated fine signal output unit 39-8a has a function to output an interpolated fine signal.

Upon reception of a sampling curve (FIG. 11) consists of actual measurement values of a detected signal, the abnormal data detecting unit 39-5a detects abnormal data for each of the coarse signal and the fine signal. A sampling curve in the case where the measurement data deviate from the range of the upper limit Xm+ε to the lower limit Xm−ε (predetermined range) of the average value Xm is shown in FIG. 12. As a result, a projected portion of the sampling curve is detected by the abnormal data detecting unit 39-5a, and the detected abnormal data is eliminated by the abnormal data eliminating unit 39-6a. The structure of the fine signal processing system is as described above, and the fine signal processing system and the coarse signal processing system basically have the same function, although there is a difference of the fine signal and the coarse signal. This point is as described above. Therefore, the above explanation of the fine signal processing system applies as it is to the coarse signal processing system by replacing the fine signal with the coarse signal.

As a substitute for abnormal data eliminated from the measurement data, the interpolation processing units (data interpolation processing units) 39-7a, 39-7b select a predetermined data row based on measurement data immediately before or after the eliminated abnormal data for example, and obtains an average value of the data row. This is because the effect of oversampling can be maximized by compensating the amount missed by the elimination with the average value.

As shown in FIG. 10, in the case where the oversampling unit is not provided in the fine signal processing system, namely, detection and elimination is performed without oversampling, whether it is abnormal data or not is detected as follows. For example, when measurement is performed at time $t_n$, the average angle calculation processing unit 39-4a calculates the average value Xm of measurement data constantly at predetermined time intervals ($t_n-1$ to $t_n-k$, for example k=5) before $t_n$. Next, with reference to the Xm, whether it is abnormal data or not deviating from the predetermined range is detected in the abnormal data detecting unit 39-5a. When the data has abnormality, the abnormal data eliminating unit 39-6a eliminates the data, and as a substitute for the eliminated data, selected data is interpolated in the interpolation processing unit 39-7a. The interpolated data is outputted from the interpolated fine signal output unit 39-8a. As above, in the case of providing the oversampling unit and the case of not providing the oversampling unit, data to be selected in the data interpolation processing unit is different. The following applies to both the case of providing the oversampling unit and the case of not providing the oversampling unit.

Note that as an interpolation method different from the above interpolation method, there is a method using average data. Specifically, when an actual value of abnormal data deviates from the predetermined range of the upper limit Xm+ε to the lower limit Xm−ε, the interpolation processing unit 39-7a (interpolation processing unit 39-7b) can perform calculation and interpolation simply and instantly, with the generated time of the abnormal data being ti, by an average value of data at ti−1 immediately before and at ti+1 immediately after (data at ti−1+data at ti+1 immediately thereafter)/2. In this manner, as a result of interpolating the sampling curve by a prediction function of prediction values (linear function y=ax+b (a, b are constants, horizontal axis x is time, and vertical axis y is angle)), data with quite high accuracy are measured.

The absolute angle calculation converter 39-9 has a function to calculate an interpolated fine signal outputted by the interpolated fine signal output unit 39-8a and an interpolated coarse signal outputted by the interpolated coarse signal output unit 39-8b and calculate an absolute angle of the steering shaft based on a measurement result thereof. Specifically, the interpolated fine signal and the interpolated coarse signal are both inputted to the absolute angle calculation converter 39-9, where both the signals are converted to the absolute angle of the steering shaft. The calculated steering shaft rotation angle is transmitted to the CAN transceiver 44 via a TX line.

The embodiment 2 is not limited to the above-described example, where various changes and modifications can be conceived. For example, when interpolating measurement data, the prediction function of a predicted value is not limited to one approximating to a straight line of linear function, where interpolation may be carried out with the prediction function approximating to a curve of quadratic or higher order polynomial. This case is beneficial when the number of abnormal data is large, and it is possible to increase accuracy by obtaining a sampling curve, which is interpolated by obtaining a prediction function (approximating function) of a prediction value with a least squares method, a spline approximation or the like.

The invention claimed is:

1. A rudder angle sensor attached to a steering shaft for measuring an absolute angle of the steering shaft, comprising:
   a coarse signal measuring mechanism and a fine signal measuring mechanism which measure a rotation angle of the steering shaft which rotates a predetermined number of times, said coarse signal measuring mechanism outputting a coarse signal and said fine signal measuring mechanism outputting a fine signal; and
   a calculating mechanism which calculates the absolute angle of the steering shaft based on coarse signal measurement data and fine signal measurement data converted from the coarse signal and the fine signal respectively,
   wherein said calculating mechanism is constituted by including an abnormal data detecting and eliminating unit which detects and eliminates abnormal data deviating from a predetermined range from the measurement data.

2. The rudder angle sensor according to claim 1, wherein said measuring mechanisms are each constituted by further including an oversampling unit which performs plural times of excessive measurement from at least the fine signal.

3. The rudder angle sensor according to claim 2, wherein said calculating mechanism is constituted by further including a data interpolation processing unit which interpolates selected data arbitrary selected from the measurement data as a substitute for the eliminated abnormal data.

4. The rudder angle sensor according to claim 1, wherein said calculating mechanism is constituted by further including a data interpolation processing unit which interpolates selected data arbitrary selected from the measurement data as a substitute for the eliminated abnormal data.

5. The rudder angle sensor according to claim 1, wherein said calculating mechanism is constituted by further including a data interpolation processing unit which calculates an average value of data immediately before and after the eliminated abnormal data from the measured data and interpolates the average value as a substitute for the eliminated abnormal data.

6. A rudder angle sensor attached to a steering shaft for measuring an absolute angle of the steering shaft, comprising:
   a main drive gear interlocked with the steering shaft to rotate reversibly;
   a first detecting means detecting a rotation angle of a fine signal gear which interlocks with said main drive gear to rotate; and
   a second detecting means detecting a rotation angle of a coarse signal gear which interlocks with said main drive gear to rotate,
   wherein said first detecting means is constituted by including a hall element which outputs a fine signal indicating the detected rotation angle of the fine signal gear and a magnet, and
   wherein said second detecting means is constituted by including a potentiometer which outputs a coarse signal indicating the detected rotation angle of the coarse signal gear.

7. The rudder angle sensor according to claim 6, further comprising:
   a calculating mechanism which calculates an absolute angle from both of said first detecting means and said second detecting means by the fine signal gear rotating with increasing speed relative to said main drive gear and the coarse signal gear rotating with decreasing speed relative to said main drive gear.

8. The rudder angle sensor according to claim 7, wherein said calculating mechanism provides an absolute angle $\theta a$ by $\theta a = \theta b/m \pm (360/m) \times n$, where $\theta b$ is the rotation angle of the fine signal gear, $\theta c$ is the rotation angle of the coarse signal gear, m is a gear ratio between said main drive gear and the fine signal gear, and n is integer which minimizes an absolute value of $(\theta c - \{\theta b/m \pm (360/m) \times n\})$.

9. The rudder angle sensor according to claim 8, wherein said calculating mechanism is constituted by including:
   an oversampling unit which performs plural times of excessive measurement of the absolute angle $\theta a$ from at least the fine signal out of the fine signal and the coarse signal and outputs the excessive measurement data;
   an abnormal data detecting and eliminating unit which detects and eliminates abnormal data of the absolute angle $\theta a$ when the oversampling unit performs the excessive measurement and outputs the excessive measurement data; and
   an interpolation processing unit which arbitrarily selects data from the excessive measurement data or further calculates an average value from the arbitrarily selected data and interpolates the arbitrarily selected data or the average value as the substitute for the eliminated abnormal data.

* * * * *